United States Patent Office 2,916,935
Patented Dec. 15, 1959

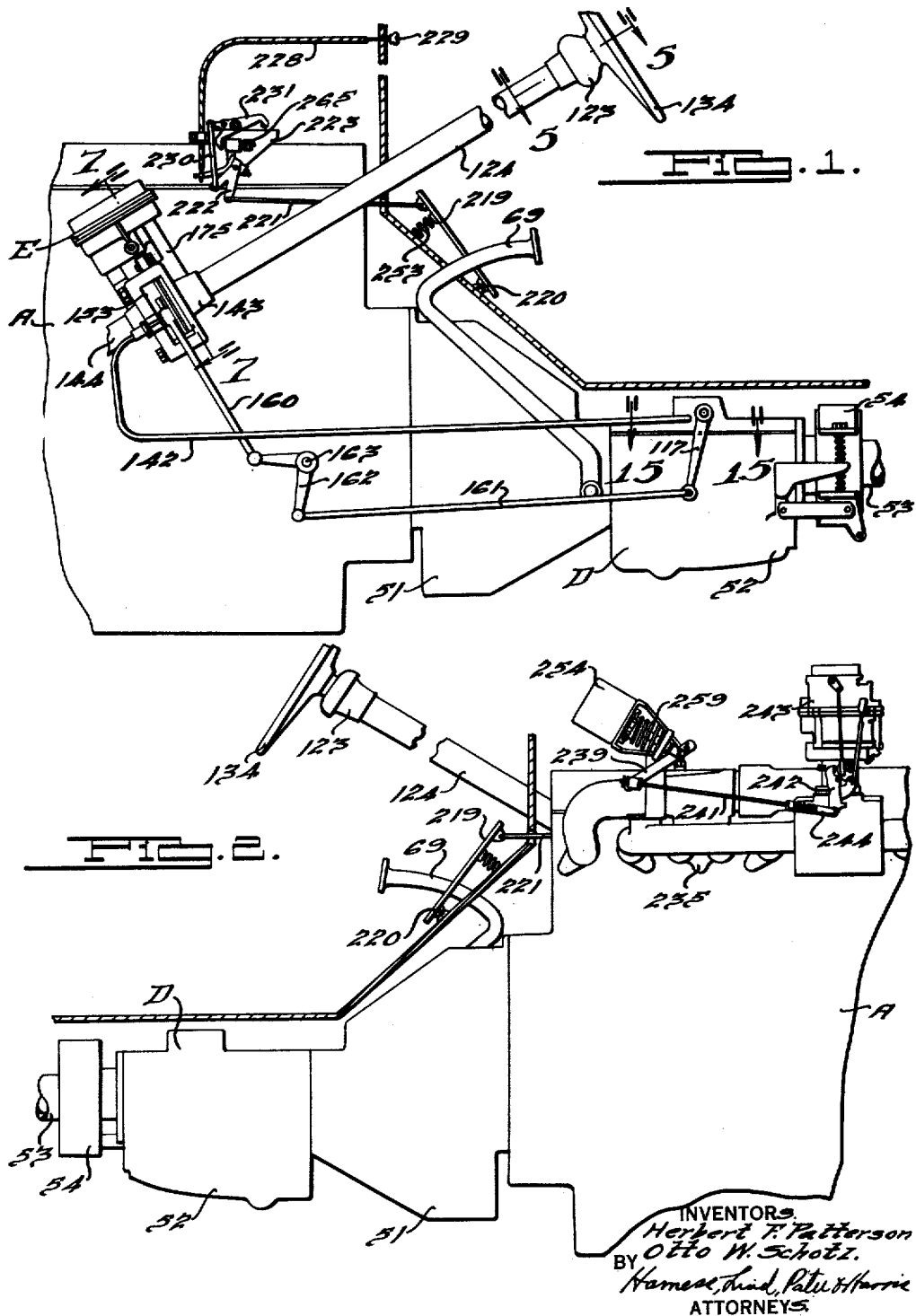

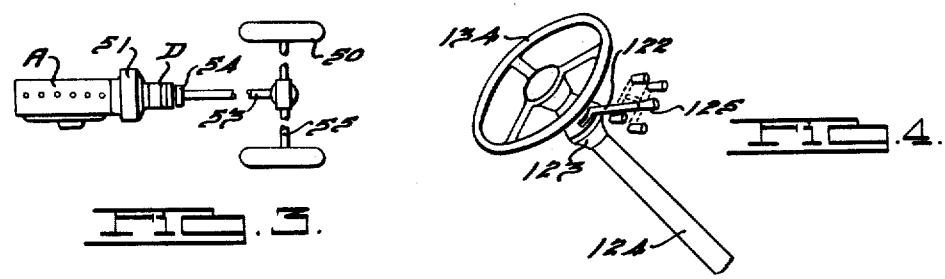
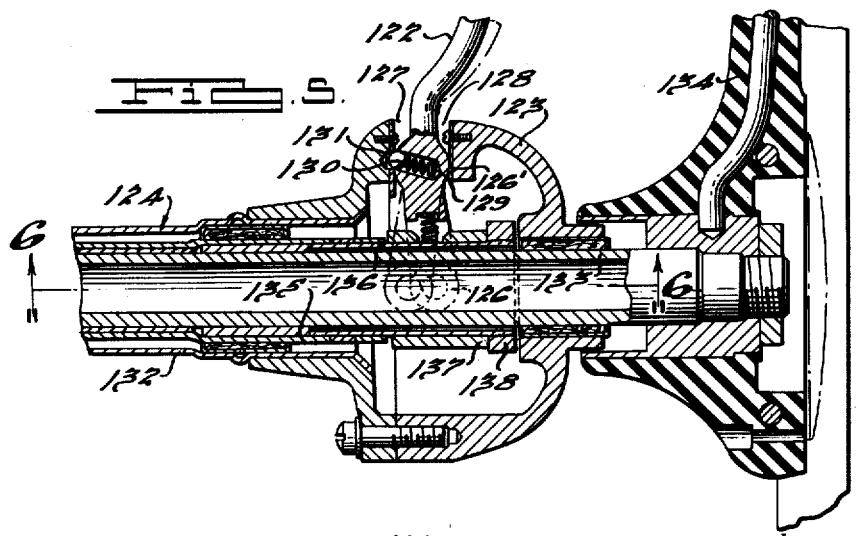
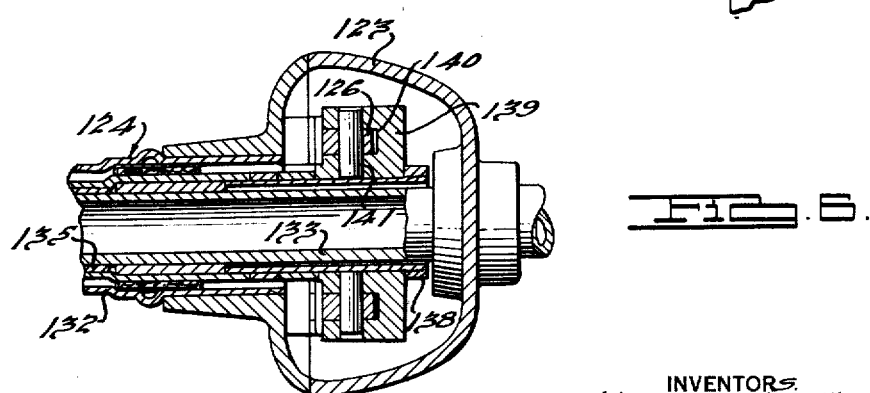

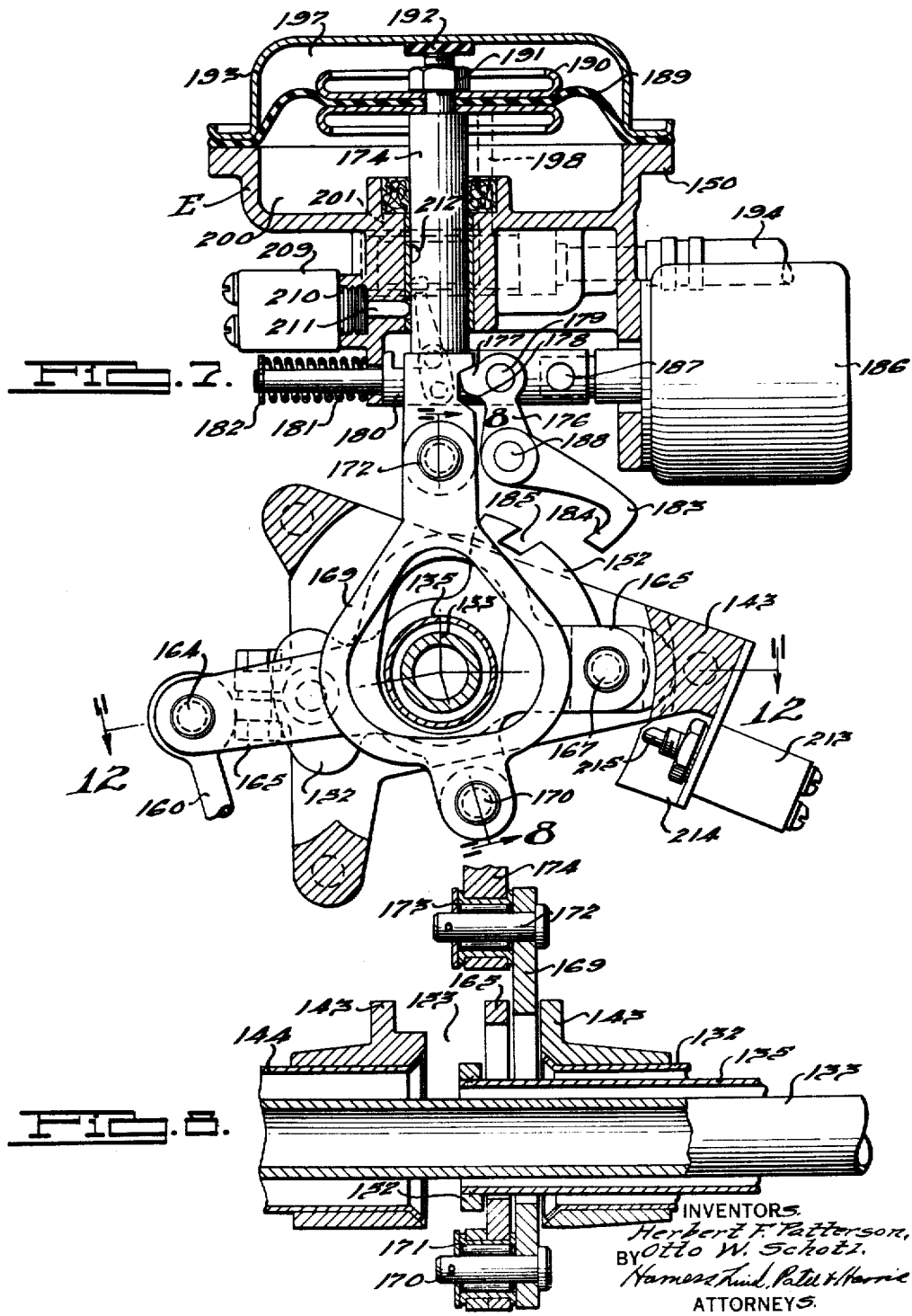

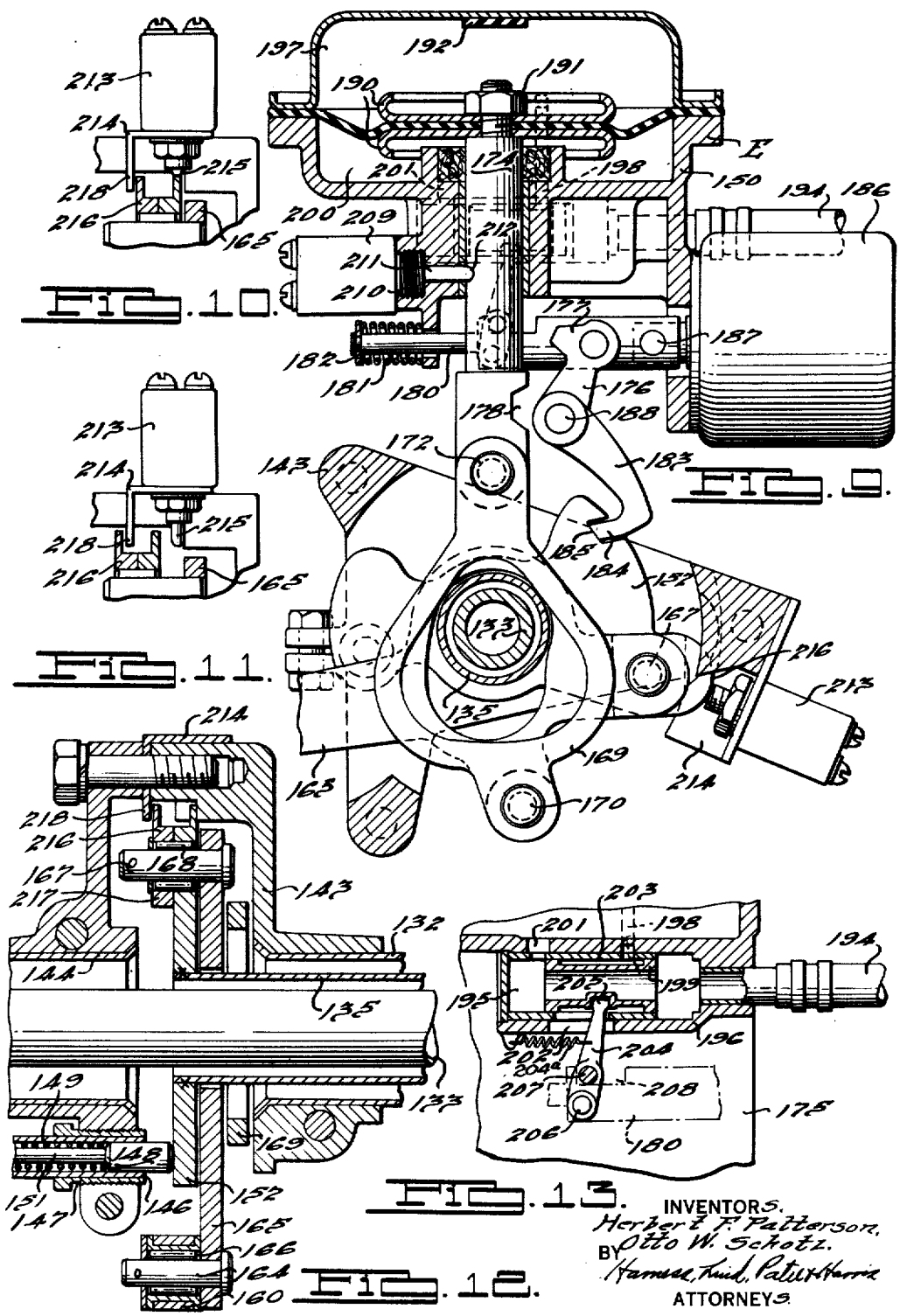

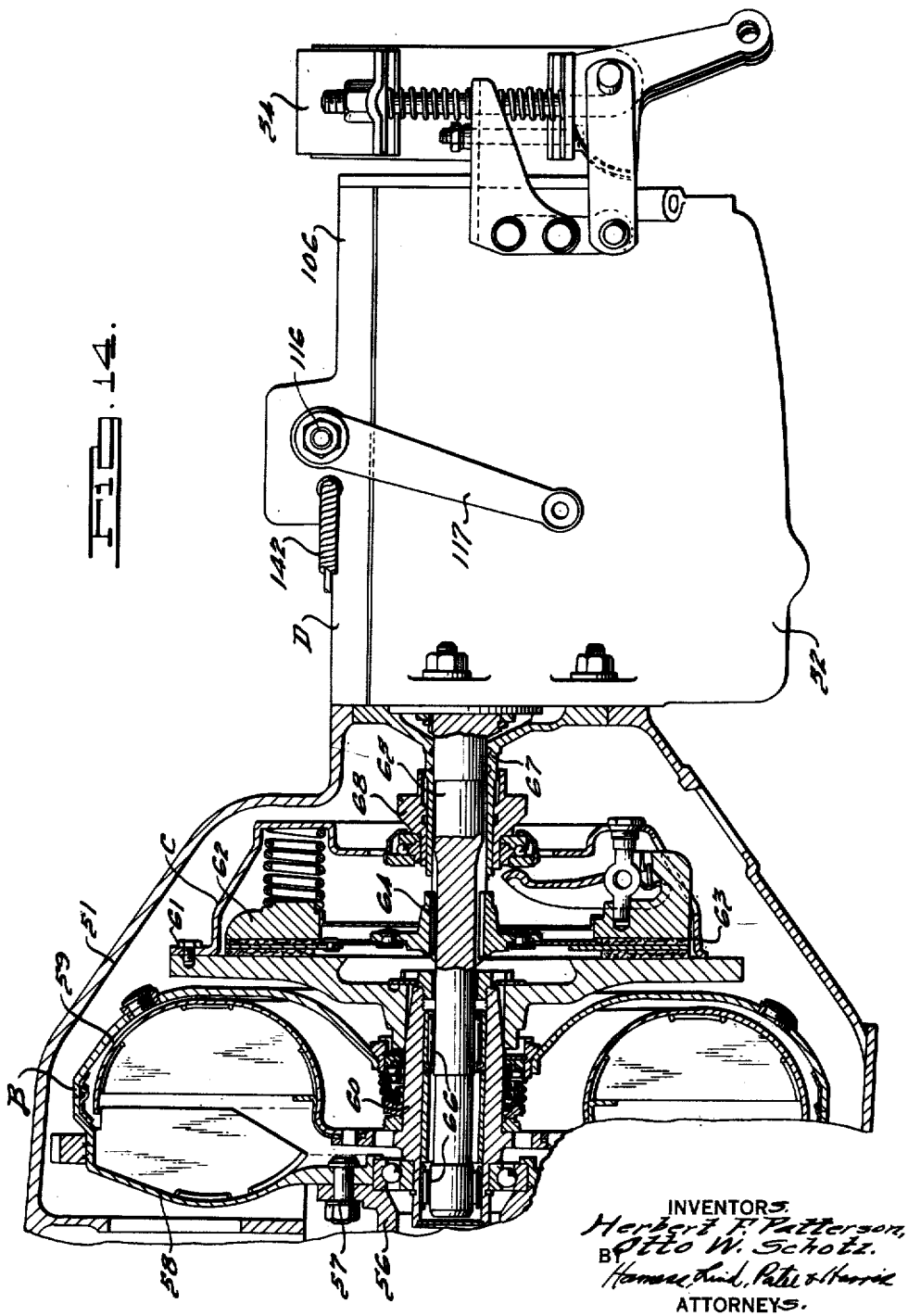

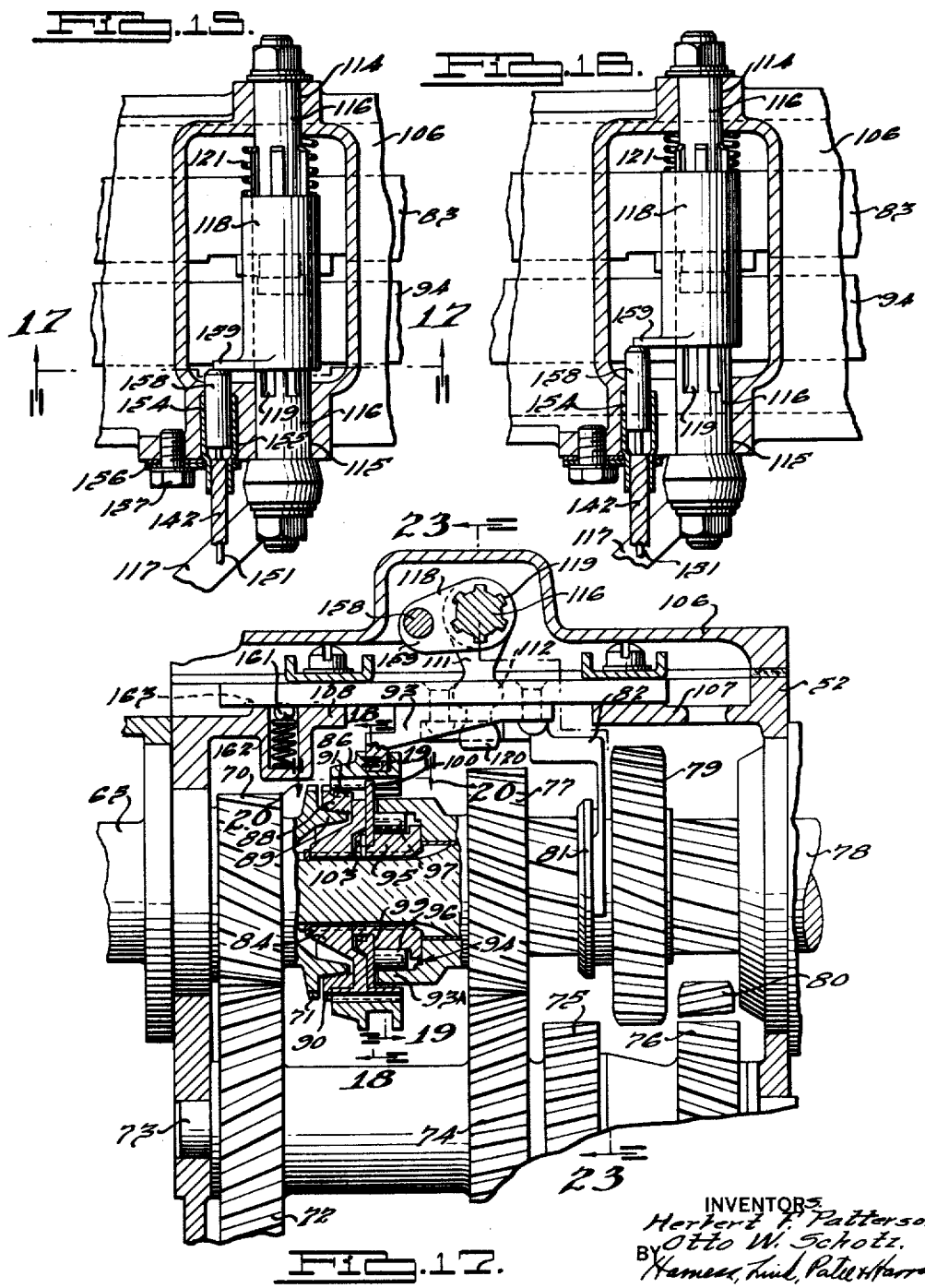

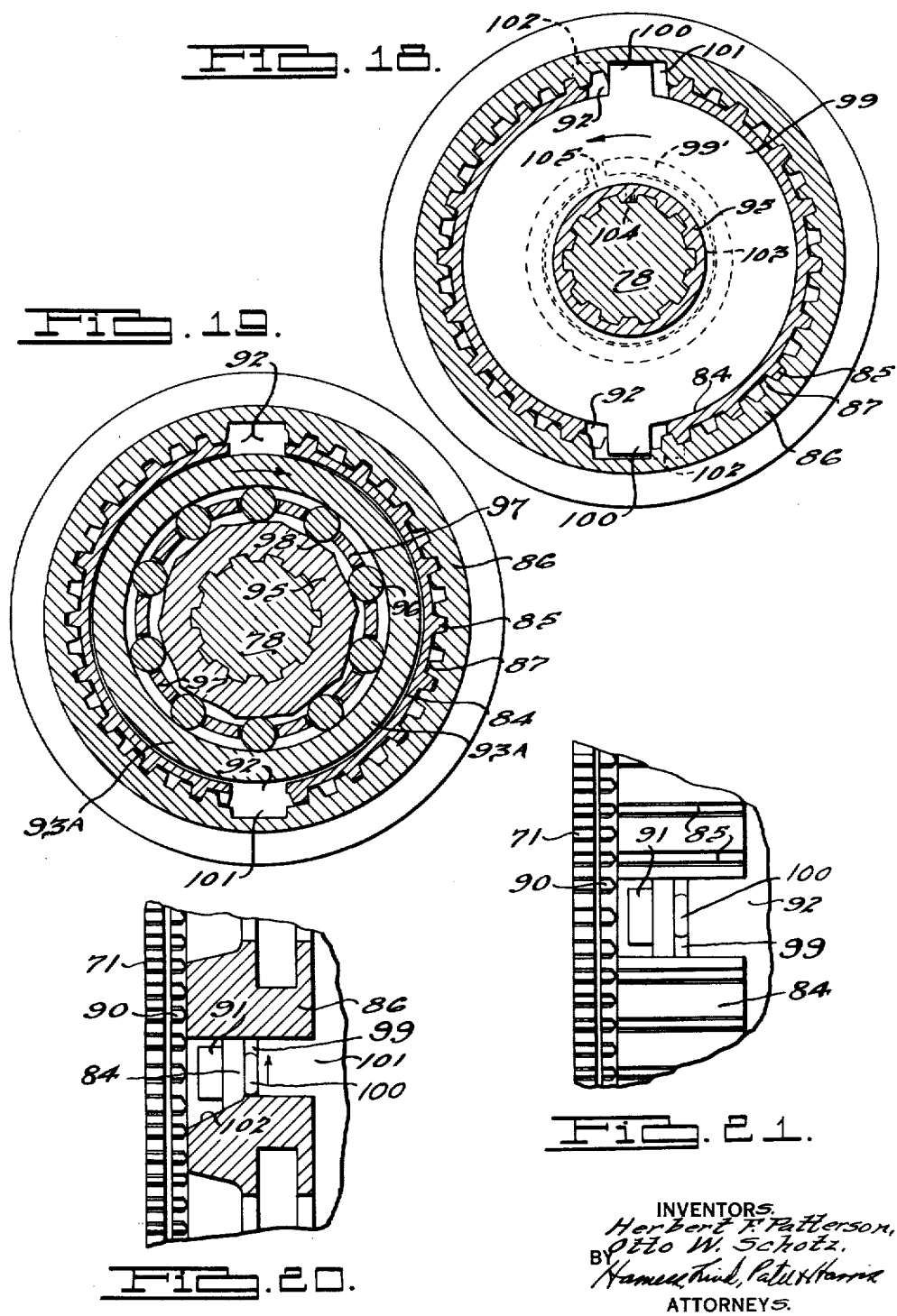

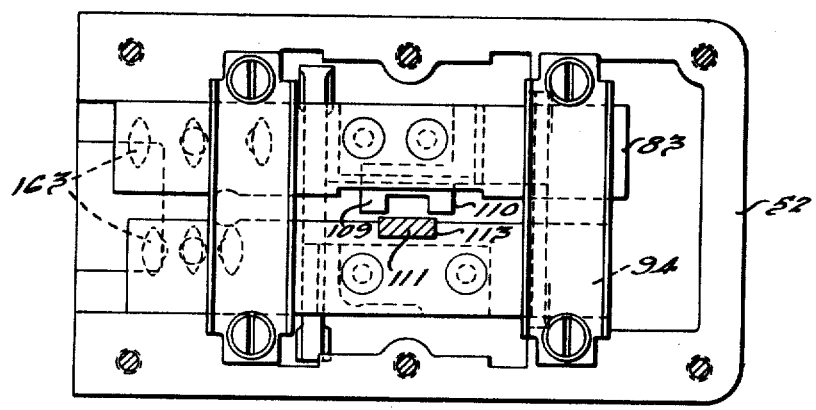
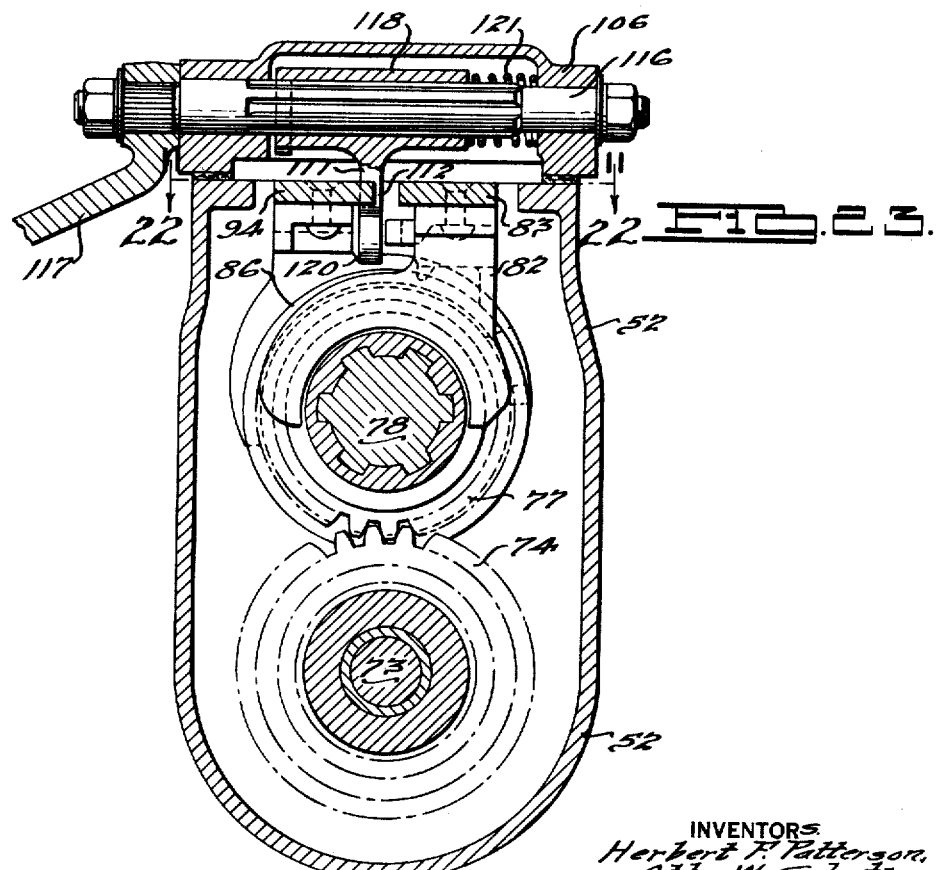

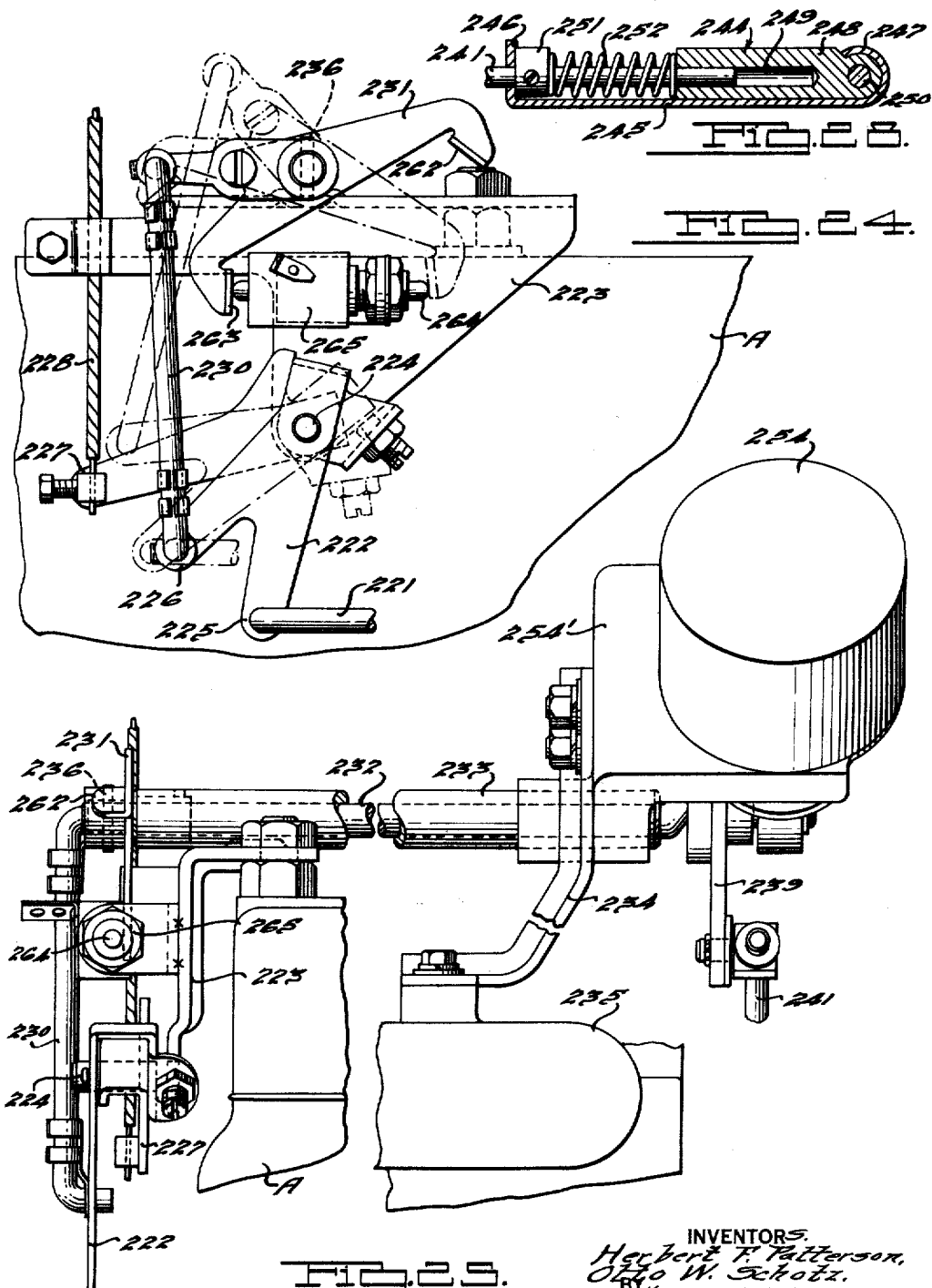

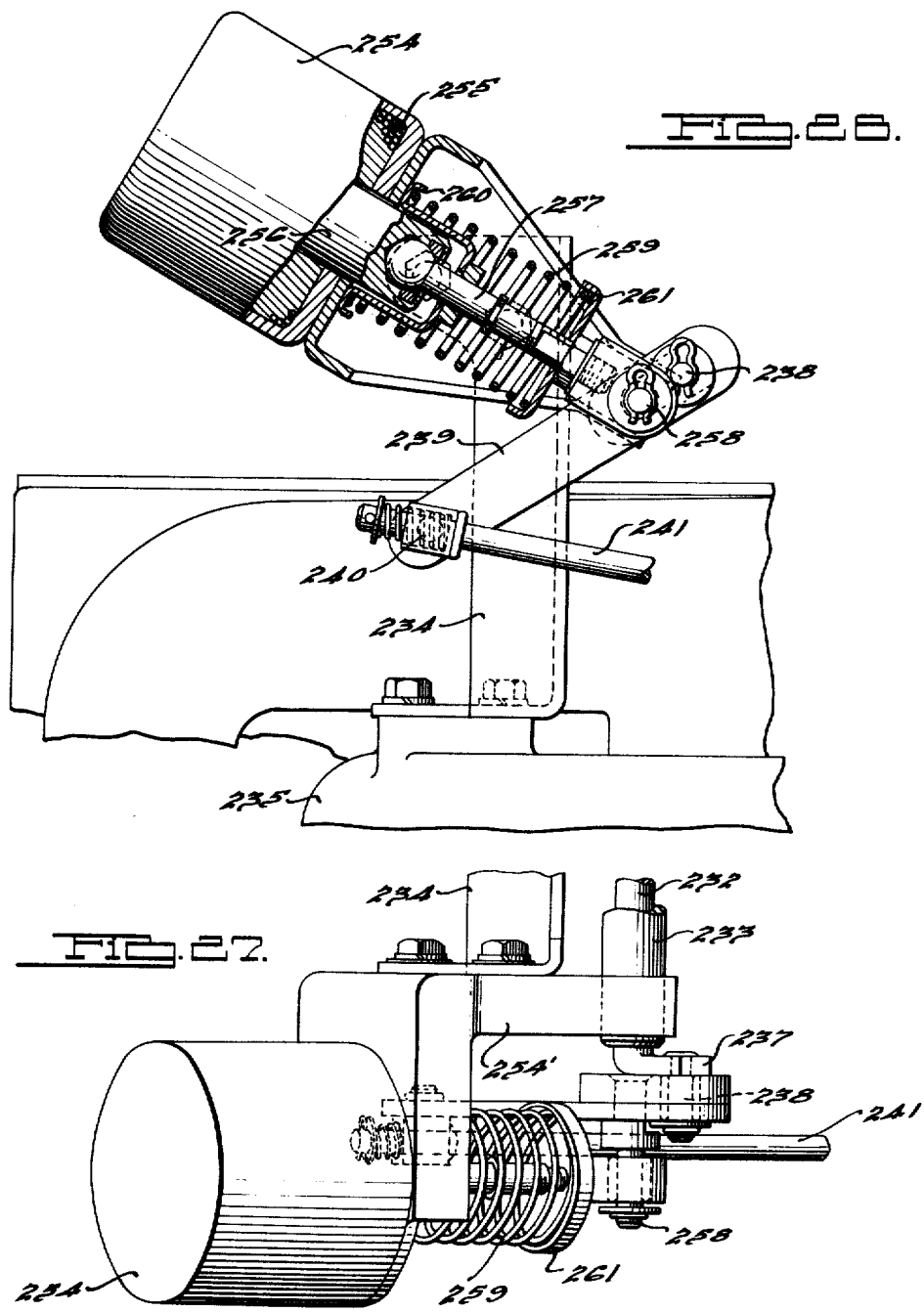

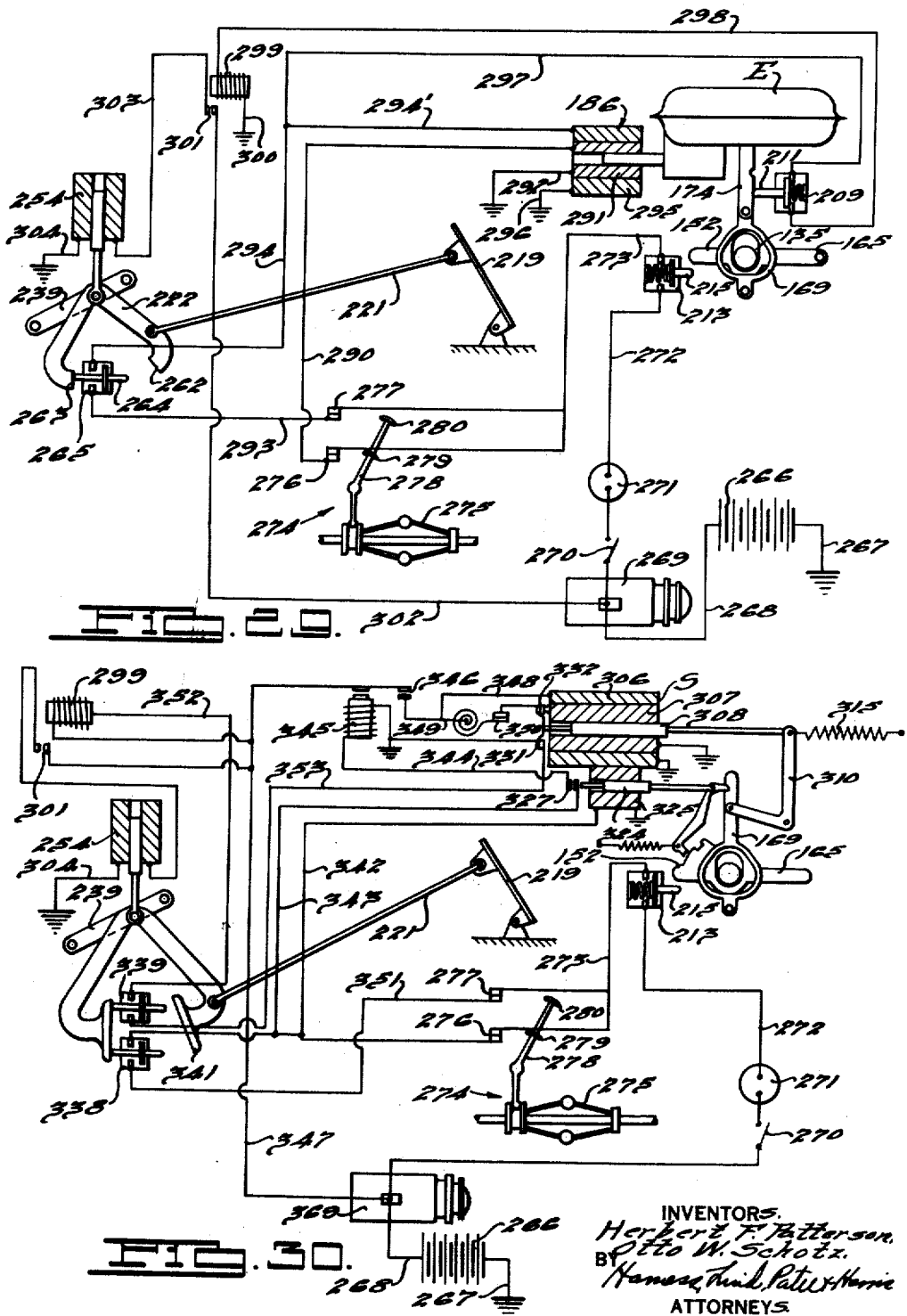

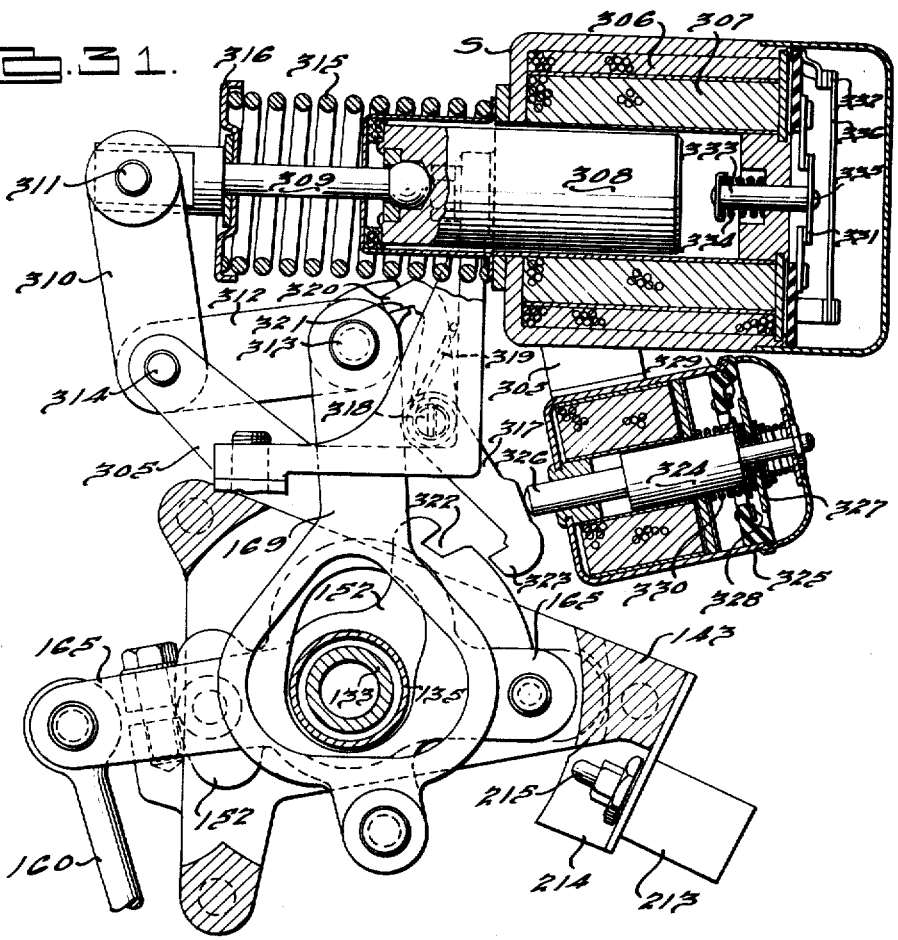
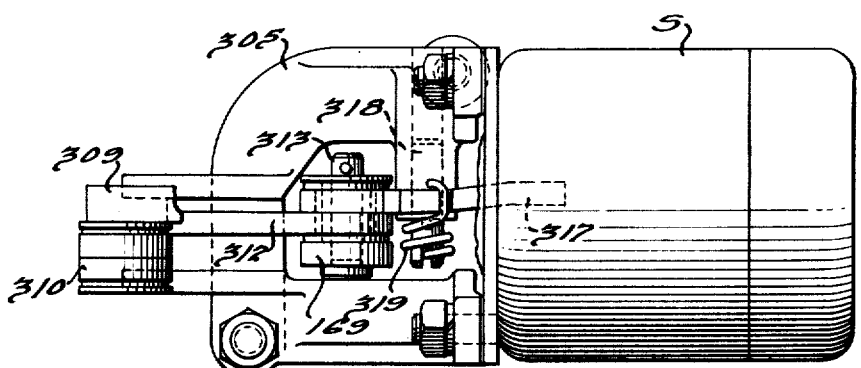

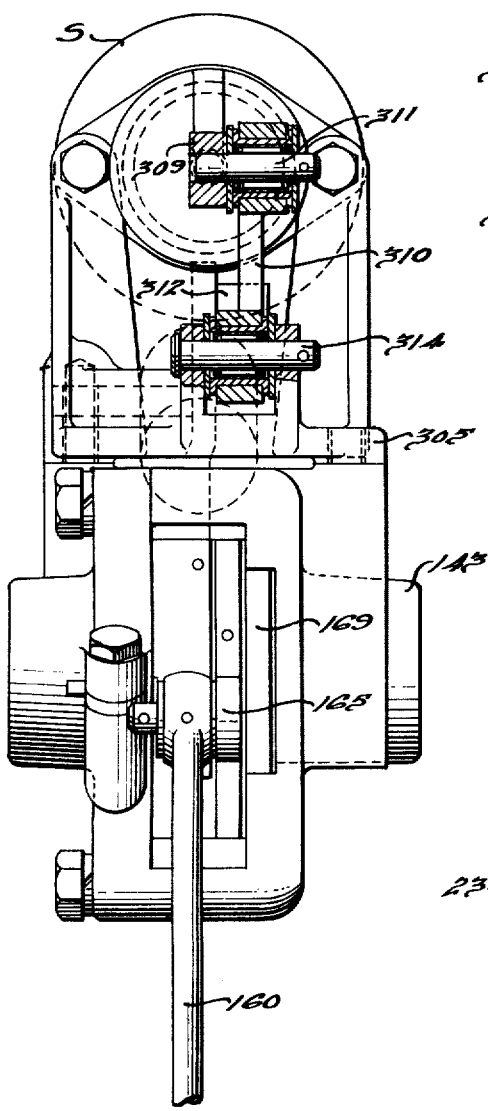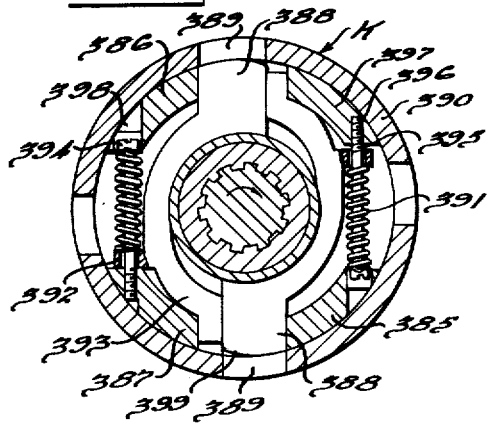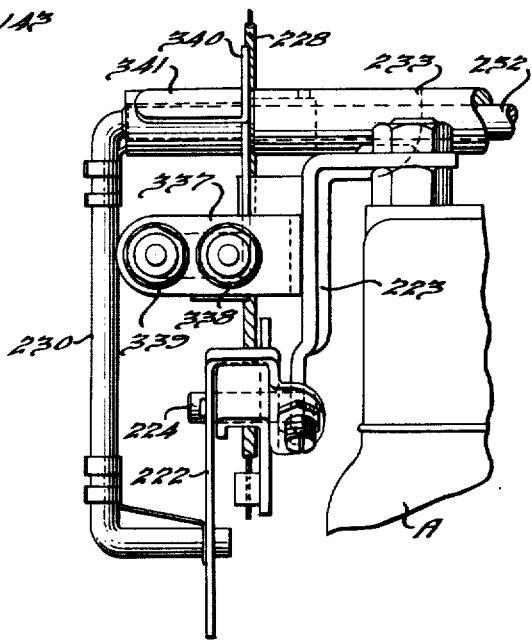

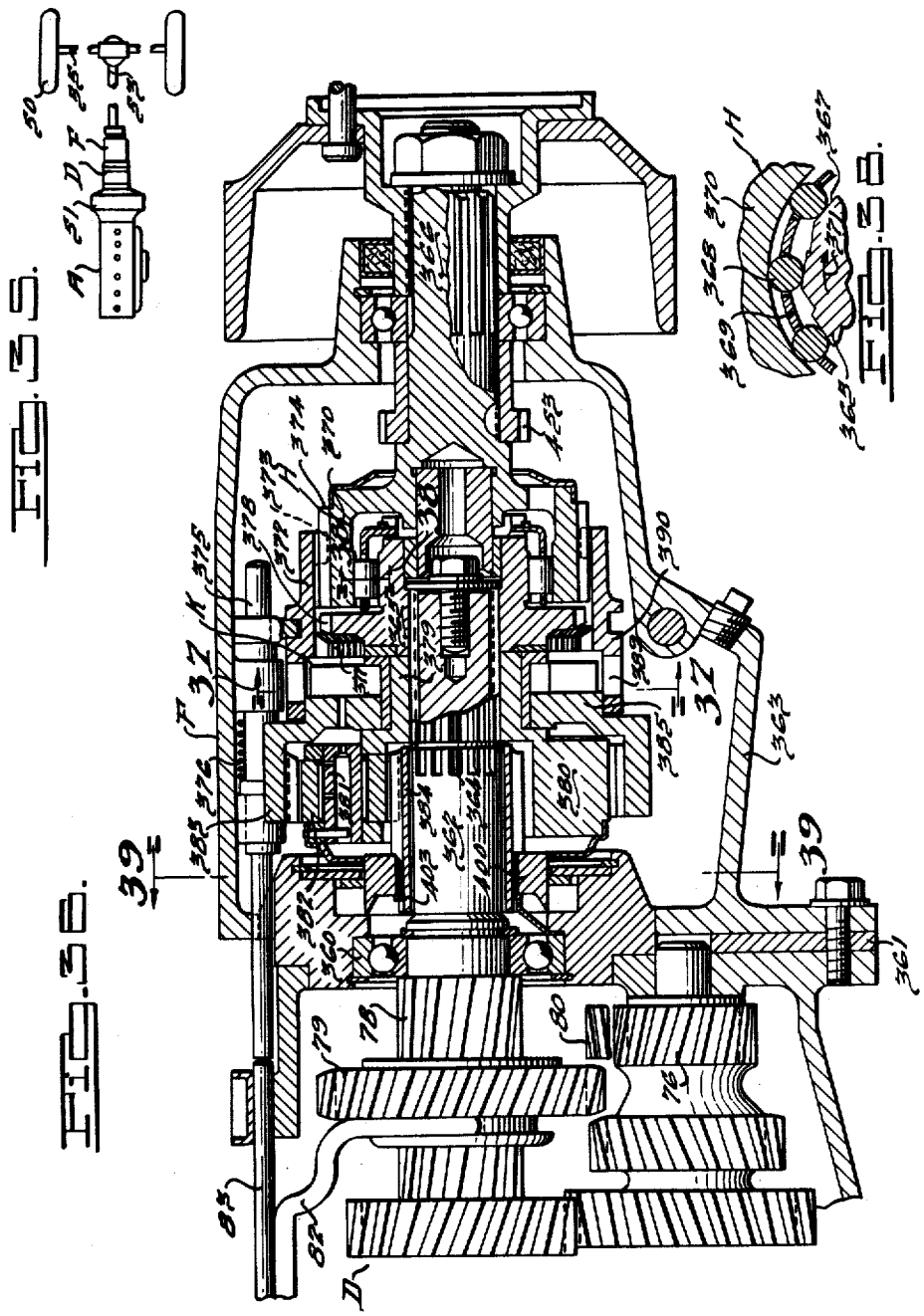

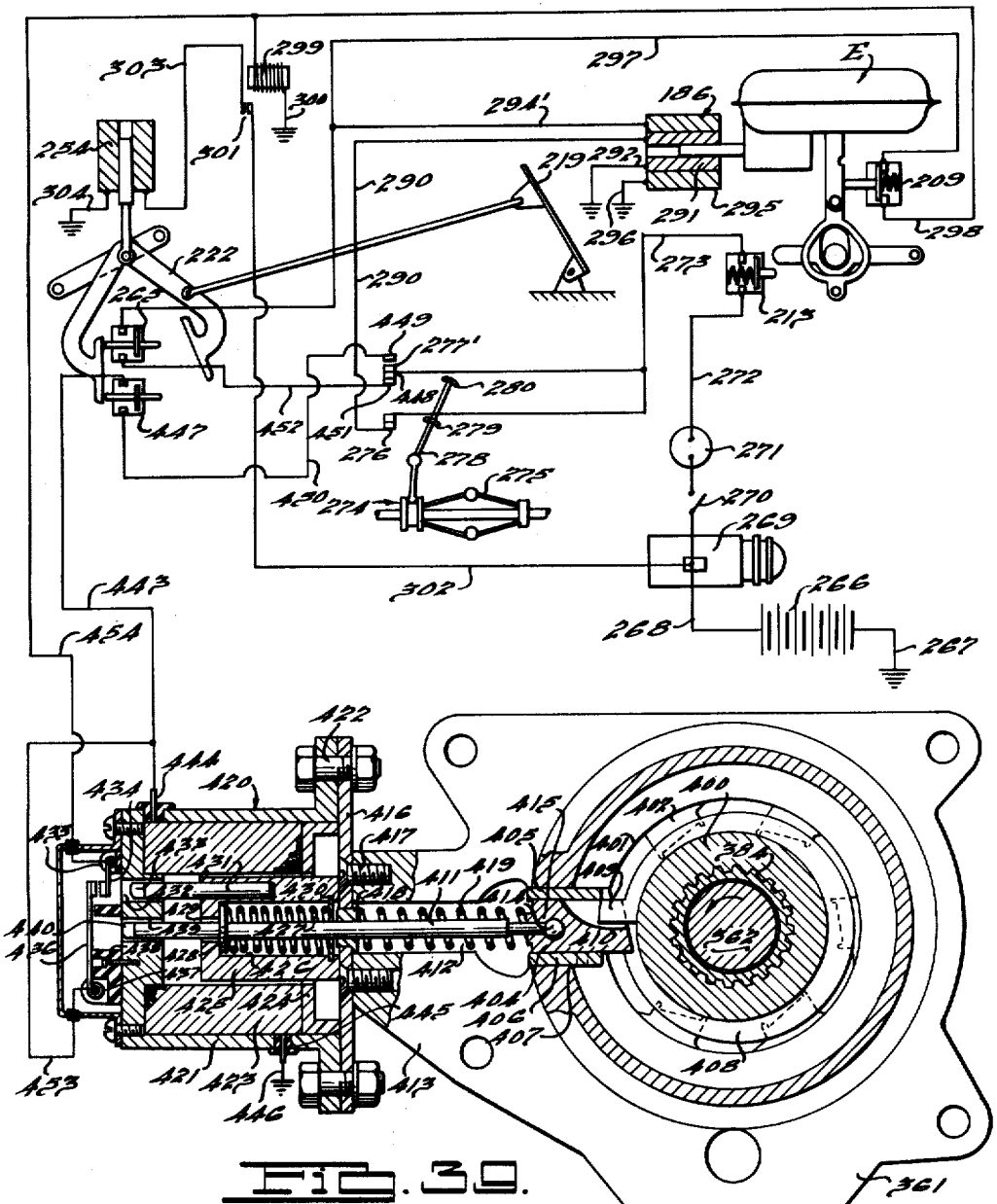

2,916,935
POWER TRANSMISSION

Herbert F. Patterson, Highland Park, and Otto W. Schotz, Detroit, Mich., assignors to Chrysler Corporation, Highland Park, Mich., a corporation of Delaware Application October 7, 1940, Serial No. 360,068

53 Claims. (Cl. 74—472)

This invention relates to power transmissions in general and particularly to transmissions adapted for power shifting and to the power means and controls thereof.

It is the principal object of the invention to provide improved power operated mechanism for shifting the clutch sleeve of the power transmission described and claimed in the co-pending application of Herbert F. Patterson, Serial No. 335,434, filed in the United States Patent Office on May 16, 1940, now Patent No. 2,309,864 dated February 2, 1943.

It is an additional object of the invention to provide such a power operated mechanism which is simple, economical to manufacture and foolproof in operation.

A further object is to provide improved control means for said power operated mechanism which functions to cause automatic operation of the power shifting mechanism under certain conditions of vehicle operation and which also permits the driver to control the power shifting under other conditions of operation.

A still further object is to provide an improved drive releasing means for use with all types of shifting mechanisms which will permit shifting of the transmission gears without necessitating release of the main vehicle clutch.

A still further object resides in the provision of novel means for securing release of the drive for shifting purposes by momentarily closing the throttle valve by power operated means.

A still further object resides in the provision of an overdrive transmission in conjunction with a gearbox of the aforesaid underdrive type with novel control means whereby a power shift to a lower ratio may be obtained in either the underdrive or the overdrive, depending upon the vehicle speed, by the manipulation of a single control.

A further object is to provide novel automatically operated latch means for the underdrive shifting mechanism by means of which both manual and power shifting is instantaneously available at all times when the vehicle is in direct drive or overdrive ratio.

Other objects and advantages will be readily apparent to those skilled in the art from reading the following description in conjunction with the accompanying drawings which illustrate preferred embodiments of our invention.

In the drawings,

Fig. 1 is a view in elevation of the left side of the driving mechanism of a motor vehicle embodying the present invention.

Fig. 2 is a view in elevation of the right side of the mechanism shown in Fig. 1.

Fig. 3 is a diagrammatic plan view of the driving mechanism of Figs. 1 and 2 showing the drive to the vehicle road wheels.

Fig. 4 is a perspective view of the steering column and shift lever showing the different positions of the lever during shifting of the transmission gears.

Fig. 5 is a sectional view along line 5—5 of Fig. 1.

Fig. 6 is a sectional view along line 6—6 of Fig. 5.

Fig. 7 is a sectional view along line 7—7 of Fig. 1 illustrating the shifting and latch mechanism in their neutral positions.

Fig. 8 is a sectional view along line 8—8 of Fig. 7.

Fig. 9 is a view of the mechanism of Fig. 7 as it appears after a power shift from direct to intermediate speed ratio drive has been made.

Fig. 10 is a detail view, partly in section, of the shift mechanism of Figs. 7 and 9 showing the parts in their low or first speed ratio position.

Fig. 11 is a view of the Fig. 10 mechanism with the parts in high or direct drive position.

Fig. 12 is a sectional view along line 12—12 in Fig. 7.

Fig. 13 is a detail view of the valve mechanism shown in dotted lines in Figs. 7 and 9.

Fig. 14 is a view in elevation of the Fig. 1 transmission with some of the parts broken away to show sectional details thereof.

Fig. 15 is a sectional view along line 15—15 of Fig. 1 illustrating the transmission selector mechanism.

Fig. 16 is a view of the Fig. 15 mechanism in another operative position.

Fig. 17 is a sectional view of the transmission as viewed along the line 17—17 of Fig. 15.

Fig. 18 is a sectional view along line 18—18 of Fig. 17 looking forwardly thereof.

Fig. 19 is a sectional view along line 19—19 of Fig. 17 looking rearwardly thereof.

Fig. 20 is a sectional view along line 20—20 of Fig. 17.

Fig. 21 is a view similar to Fig. 20 but with the shift sleeve removed.

Fig. 22 is a view of the shift rails taken as indicated by the line 22—22 on Fig. 23.

Fig. 23 is a sectional view taken along line 23—23 of Fig. 17.

Fig. 24 is an elevational view on an enlarged scale of the left hand portion of the Fig. 1 throttle and kickdown control mechanism.

Fig. 25 is an elevational view of the throttle and kickdown control mechanism from the rear thereof.

Fig. 26 is an elevation of the right hand portion of the throttle and kickdown control with parts broken away to show details thereof.

Fig. 27 is a plan view of the Fig. 26 mechanism.

Fig. 28 is a sectional detail view on an enlarged scale of the lost motion overtravel connection which connects the accelerator operated throttle adjusting rod with the throttle valve lever.

Fig. 29 is a diagrammatic view of the electrical circuit for controlling the vacuum operated power shifting apparatus.

Fig. 30 is a diagrammatic view of the electrical circuit for controlling the solenoid operated power shifting apparatus.

Fig. 31 is a plan view, similar to Fig. 7, but illustrating the shifting and latch mechanism of the solenoid operated system, the parts being shown in neutral position.

Fig. 32 is an endwise elevational view of the Fig. 31 mechanism as seen from the top of the sheet.

Fig. 33 is an elevation, partly in section, of the Fig. 31 mechanism as seen from the left hand side of the sheet.

Fig. 34 is an elevational view of the Fig. 25 kickdown and throttle control as modified to conform to the wiring diagram of Fig. 30.

Fig. 35 is a diagrammatic plan view of a motor vehicle driving mechanism employing an overdrive gearbox in addition to an underdrive gearbox of the Fig. 17 type.

Fig. 36 is a sectional elevational view of a transmission of the type embodying both an underdrive and an overdrive.

Fig. 37 is a sectional view along line 37—37 of Fig. 36.

Fig. 38 is a fragmentary sectional view taken along line 38—38 of Fig. 36.

Fig. 39 is a sectional view along line 39—39 of Fig. 36 including a diagrammatic view of the electrical circuit for controlling the Fig. 36 transmission.

Referring for the moment to Figs. 1 to 23, inclusive, it may be seen that the vehicle is provided with an engine A of the internal combustion type which is connected to the rear drive wheels 50 through a fluid coupling B, a friction clutch C and a change speed transmission D. The fluid coupling and friction clutch are enclosed in a casing 51 to which is attached the transmission casing 52. A propeller shaft 53 having a parking brake structure 54 associated therewith connects the tailshaft of the transmission with the rear axle 55 on which the driving wheels are carried.

Referring now to Fig. 14, it will be seen that the crankshaft 56 of engine A is fastened by bolts 57 to the impeller 58 of the fluid coupling B. The latter is provided with a runner 59 carried by a hub 60 to which is splined the driving member 61 of friction clutch C. Clutch C has the usual pressure plate 62 and driven disc 63, the latter being slidably carried at 64 on a shaft 65 which is piloted at its forward end in the hub 60 by the bearing 66, the rearward end of shaft 65 being carried by the housing extension 67.

The impeller 58 and runner 59 of fluid coupling B are provided with radially disposed circumferentially spaced vanes which form fluid circulating passages through which the fluid of the coupling is circulated in the well known corkscrew fashion by the drive of crankshaft 56 thereby imparting a drive to runner 59 which is transmitted to shaft 65 through friction clutch C, the latter being provided with a release mechanism 68 adapted to be actuated by clutch pedal 69 (Fig. 1) for releasing the drive of the coupling to permit shifting of the gears in transmission mechanism D.

Shaft 65 constitutes the input shaft of the transmission D and has a pinion 70 and a set of clutch teeth 71 formed adjacent the end thereof. The pinion 70 is in permanent mesh with a cluster gear 72 carried for rotation on a countershaft 73 which is mounted at each of its ends in casing 52. The countershaft gear cluster also comprises a second speed drive gear 74, a low speed drive gear 75 and a reverse drive gear 76. The gear 74 meshes with the second speed driven gear 77 which is journalled on tailshaft 78, said shaft also carrying a low-reverse driven gear 79 which is slidably splined thereon for shifting into mesh with gear 75 to establish a low speed drive or into mesh with reverse idler gear 80 to establish reverse drive, the gear 80 being mounted adjacent the gear 76 and in permanent mesh therewith.

Gear 79 is provided with a shift yoke receiving collar 81 which is adapted to receive the finger of a shift yoke 82 carried by a shift rail 83 (Figs. 15 and 16).

Shaft 78 has splined thereon a driving hub 84 having external teeth 85 (Figs. 18 and 19) on which is slidably carried a shift sleeve 86 having internal teeth 87 which mesh with the teeth 85. A blocker type synchronizer ring 88 is carried on a cone-shaped portion 89 of shaft 65 and is provided with a set of blocking teeth 90 which are adapted to block shift of sleeve 86 into engagement with the clutch teeth 71 except when the shafts 65 and 78 are rotating at the same speed. The ring 88 has a pair of diametrically oppositely disposed lugs 91 which project outwardly into slots 92 provided in hub 84 as shown in Figs. 18, 19 and 21.

The sleeve 86 is engaged by a shift yoke 93 carried by a shift rail 94 disposed in juxtaposed parallel relation with respect to the shift rail 83. When the shaft 65 is rotating, lug 91 will engage one side of the slot 92 and synchronizer ring 88 will be carried around with hub 84, the teeth 90 under such conditions being misaligned with the teeth 71 and 85 to thereby block shift of the sleeve 86.

Upon shift of the sleeve 86 forwardly to engage the teeth 71, teeth 87 will first engage teeth 90 of the ring 88 which are misaligned therewith and the ring 88 will be forced on to the cone portion 89 with considerable pressure whereupon the shaft 65 will be slowed down and brought into synchronism with the shaft 78 (clutch C having been previously disengaged by manipulation of clutch pedal 69). The speed of shaft 65 will tend to fall below that of shaft 78 which is driven by the momentum of the vehicle and the ring 88 will be moved by the gripping action between the cone portion 89 and the ring 88 to unblock the teeth 87 whereupon these teeth will pass between the teeth 90 of ring 88 and sleeve 86 will slide into engagement with clutch teeth 71 to establish a direct drive between shafts 65 and 78. The hub 84 has alternate teeth removed to facilitate ease of shifting.

Second speed gear 77 has a forwardly extending sleeve portion 93A which forms the drive element of an overrunning roller clutching 94, the driven element thereof comprising a hub member 95 splined on shaft 78 as illustrated. A set of rollers 96 carried by a cage 97 act to establish a one-way overrunning drive between the clutch elements 93A and 95 when in such position that they engage the upwardly sloping portions of the cams 98 formed on hub 95. When the rollers 96 are in contact with the low portions of cams 98, no drive will be transmitted in either direction through the clutch 94.

Cage 97 is carried by a disc-like member 99 which is journalled on the forward reduced end portion of clutch member 95 and has a pair of diametrically oppositely outwardly extending lugs 100 which respectively extend into a pair of correspondingly located longitudinally disposed slots 101 milled in sleeve 86 in radial alignment with the slots 92 of hub 84. The slots 101 as illustrated in Figs. 18 and 20 are cut away in an oblique direction as indicated at 102 for a purpose which will presently be explained.

A spring 103 of the expansion type has one end engaged with the clutch element 95 at 104 (Fig. 18), the other end thereof being engaged in a slot 105 provided in the forwardly extending collar portion 99' of disc 99. The spring 103 acts to constantly urge the disc 99 in a counterclockwise direction of rotation as viewed in Fig. 18 thereby tending to maintain the rollers 96 of the overrunning clutch 94 in engagement with the upwardly sloping drive portions of cams 98.

When the sleeve 86 is in the position shown in the drawings with the lugs 100 in engagement with the straight side portions of the slots 101, the spring 103 is contracted and disc 99 is in such position that the rollers 96 are free to roll on the low portions of cams 98. Thus no drive will be transmitted through clutch 94 and this position of the sleeve corresponds to neutral in conventional transmissions. When the sleeve 86 is shifted forwardly to clutch with the teeth 71, the lugs 100 are still engaged with the straight side portions of slots 101 and the rollers 96 are retained in their non-driving positions during direct drive setting of the transmission. When sleeve 86 is shifted rearwardly of neutral position, the lugs 100 then engage the inclined side portions 102 of slots 101 and disc 99 together with cage 97 will be rotated clockwise of Fig. 19 thereby to engage the rollers 96 in driving relation relative to clutch elements 93A and 95. This position of sleeve 86 corresponds to second or intermediate speed ratio position in conventional transmissions and upon rotation of shaft 65, a one-way drive will be transmitted to shaft 78 through pinion 70, gears 72, 74 and 77 and clutch 94.

It is thus apparent that the drive in second speed ratio is a free-wheeling drive in a forward direction, the shaft 78 overrunning the gear 77 during tendency of the shaft 78 to rotate faster than the shaft 65 such as will occur during coast of the vehicle. The free-wheeling drive is effective in second speed ratio only, the disc 99 functioning as explained above to lock the rollers 96 out of driving engagement in all other speeds.

The aforesaid transmission is described in greater detail and is claimed in the co-pending application of Herbert F. Patterson, Serial No. 335,434, filed in the United States Patent Office on May 16, 1940.

The shifter rails 83 and 94 extend longitudinally of the transmission D at the top portion of the housing 52 which is adapted to be closed by a cover 106. A pair of flanges 107 and 108 (Fig. 17) carried by housing 52 serve to support the shift rails for sliding movement. The rail 83 carries a shift yoke 82 which, as aforesaid, engages the collar 81 of the low-reverse gear 79 and the shift rail 94 carries the shift yoke 93 which is engaged with the sleeve 86. The yoke 82 is provided with a pair of spaced lugs 109 and 110 between which is receivable a shift finger 111, the latter being provided with a part 112 which is adapted to be received into a notch 113 in rail 94.

The cover 106 has a crowned central portion provided with opposite side wall portions extending longitudinally of the transmission in which are formed registering openings 114 and 115. A shaft 116 extends transversely of the cover 106 and is journalled at its ends in the said openings. The shaft 116 has an external portion protruding from the cover member 106 on which is non-rotatably fixed a shift lever 117. A collar 118 disposed within the cover and axially slidably mounted on the intermediate portion of the shaft 116 which is provided with splines 119 for holding the collar and shaft against relative rotation carries the rail shifting finger 111 heretofore referred to which is provided with the intermediate lobe portion 112 that registers with and is adapted to be received by the notch 113 of rail 94 and a second lobe portion 120 that registers with ends receivable between the lugs 109 and 110 of shift yoke 82 upon longitudinal movement of the collar 118 toward the rail 83. A coil spring 121 bears against the right wall of cover 106 and the right extremity of the collar 118 as shown in Figs. 15, 16 and 23 for normally yieldably urging the collar 118 toward the left so as to retain the rail shifting finger 111 in operative engagement with the rail 94. The collar 118 may be moved rightwardly as viewed in the aforesaid figures to bring the lobe 120 between the lugs 109, 110 carried by the rail 83.

Apparatus for manually controlling the collar 118 may be mounted in any location of the driver's compartment of the vehicle within convenient reach of the driver and preferably comprises a gear shift lever 122 which is carried by a casing 123 having separable sections mounted on the vehicle steering column which is generally designated by the numeral 124. The manual control lever 122 has a knob 125 at its outer end and its inner end is provided with a forked extremity 126 disposed within the casing 123. Provided on the lever 122 adjacent its inner forked end is a ball-shaped enlargement 126' which is disposed between wear plates 127 mounted on opposite side walls of an arcuate slot 128 formed in the casing 123 through which the lever 122 extends. The enlarged portion 126' of the control lever has a bore 129 in which a spring pressed detent 130 is disposed. The detent 130 is adapted to engage in an aperture 131 formed in the wall of the slot 128 when the lever 122 is centrally located with respect to the opposite ends of the slot.

The steering column 124 includes an outer tube 132 on which the casing 123 is mounted and an inner tubular steering shaft 133 at the top end of which is mounted a steering wheel 134. The steering shaft 133 extends longitudinally of the steering column and is centrally located with respect to the longitudinal axis thereof.

A tubular shaft 135 extends longitudinally of the steering column 124 and is carried thereby for axial sliding and rotative movement with respect thereto. Mounted in the upper open end of the tubular shaft 135 is a sleeve 136 which is suitably secured thereto and which extends beyond the upper extremity of the shaft. A collar 137 is concentrically mounted on the upper portion of the sleeve 136 and is detachably and non-rotatably held thereon by a nut 138 as shown in Fig. 5. The collar 137 is provided with diametrically opposed bosses 139 in which are formed slots 140 for receiving the apertured end portions of the prongs of the fork 126. The fork 126 is pivotally attached to the bosses 139 of the collar by pins 141 which extend through registering apertures in the bosses and prongs of the fork respectively. The enlarged portion 126' of the lever 122 serves as a fulcrum about which the lever may be oscillated in a vertical plane as viewed in Fig. 4 to shift the shaft axially of the steering column in opposite directions. The shaft 135 may also be rotated about its axis which is coincident to the longitudinal axis of the steering column by shifting the lever 122 about the axis of the steering column, the enlarged portion 126' of the lever 122 sliding freely on the bearing surfaces 127 during this swinging movement.

Axial movement of the shaft 135 is transmitted to the collar 118 by a Bowden wire assembly generally designated by the numeral 142. One end of the Bowden wire assembly 142 is mounted on the lower element of a separable coupling 143 by means of which the lower extension 144 of the steering column housing is supported. The lower element of the coupling 143 is provided with an apertured flange 145 in which a metal tube 146 is fitted by a threaded fitting 147. Slidably mounted in the tube 146 is a plunger 148 which is normally urged toward the right of Fig. 12 by a coil spring 149 seating between the plunger 148 and a plug in the left hand end of the tube 146 as is conventional in the art. A flexible cable 151 extended through the plug is attached to the plunger 148 which bears against a plate 152 non-rotatably fixed on the lower extremity of shaft 135 and which extend outwardly of coupling 143 through an opening 153 in the side thereof which is large enough to accommodate shifting movement of the plate in unison with axial reciprocation of the shaft 135.

The opposite end of the Bowden wire assembly extends to the cover 106 of the transmission housing to which it is attached by a sleeve 154 disposed in an aperture 155 formed in the cover structure. The sleeve 154 has a reduced outer end portion and an adjacent shoulder portion which bears against a plate 156 having an aperture therein through which the reduced part of the sleeve extends. The plate 156 is firmly clamped to the transmission cover by a cap screw 157 threaded in an aperture therein. Fixed to the end of the flexible cable 151 adjacent the transmission mechanism is a plunger 158 which is slidably mounted in the sleeve 154 and which abuts against a flange 159 formed integrally with the collar 118. The spring 121 which operates upon the collar 118 normally urges the flexible cable toward the plate 152 of the shaft 135 and thereby urges the shaft upwardly of the steering column so as to retain the lever 122 in the full line position shown in Fig. 4 when it is driver manipulated and in the lower of the two parallel paths of swinging movement. When the lever is so disposed, the shift finger 111 of the collar 118 is engaged in the notch 113 of rail 94 and swinging movement of the lever 122 about the longitudinal axis of the steering column will effect corresponding movement of the lever 117 through the intermediary of links 160 and 161 and bellcrank lever 162 which is pivoted at 163 on the engine A as shown in Fig. 1 thereby shifting the sleeve 86 into either direct drive or intermediate drive position.

This can be readily understood by referring to Figs. 1 and 17 wherein it may be seen that when the control lever 122 is in its above described lower position swinging thereof in a counterclockwise direction about the axis of the steering column will cause the shift rail 94 to be moved toward the right as viewed in Figs. 15 to 17 to shift the sleeve 86 toward the right and thereby permit the spring 103 to rotate the disc 99 and cage 97 sufficiently to move the rollers 96 of overrunning clutch 94 to lock-up position, thereby establishing second speed ratio setting of the transmission. Clockwise swinging of lever 122 causes rail 94 to be moved toward the left of said figures to thereby engage the sleeve 86 with teeth 71 for establishing high speed or direct drive setting of the transmission.

Upward movement of the driver operated end of the lever 122 causes the shaft 135 to be moved downwardly of the steering column thereby urging the plunger 148 inwardly of its tube 146 and urging the plunger 158 of the Bowden wire assembly outwardly of its tube 154. This movement of the plunger 158 shifts the collar 118 toward the right of Fig. 23 compressing the spring 121 and engaging the lobe 120 of shift finger 111 between the lugs 109 and 110 of shift rail 83. When the lever 122 is then swung in a counterclockwise direction, the shift rail 83 is moved toward the right of Fig. 22 to engage gear 79 with gear 80 and establish reverse setting of the transmission. Clockwise movement of the lever 122 while the driver operated end thereof is in its uppermost path of movement moves the shifter rail 83 toward the left of Fig. 22 to mesh gear 79 with gear 75 and establish low speed ratio setting of the transmission.

The shifter rails 83 and 94 are releasably held in their respective adjusted positions by spring pressed detents 161 mounted in sockets 162 of the transmission housing 52. These detents are adapted to register with and extend into depressions 163 formed in the lower surfaces of the shifter rails as illustrated in Figs. 17 and 22.

Referring now to Figs. 1 and 7 to 13, inclusive, it may be seen that the link 160 which connects the bell-crank lever 162 is connected by an axle 164 with a lever 165, an anti-friction bearing 166 (Fig. 12) being interposed between the axle and the link 160 to provide a freely operating pivot. The lever 165 is in turn connected to the plate 152 by means of an axle 167 fixed to the lever 165 and the plate 152 is axially slidable on such axle with respect to the lever 165, a bearing 168 being provided for smooth operation. The lever 165 is in turn pivotally connected to a lever 169 by means of an axle 170 carried as shown in Fig. 8 by the lever 169 and journalled in an anti-friction bearing mounted in an aperture provided in the lever 165 as indicated at 171. The lever 169 is pivotally connected by means of an axle 172 in a bearing 173 (Fig. 8) with an operating rod 174 of a pneumatic cylinder E which is rigidly mounted on the coupling 143 at the lower end of the steering column by means of a bracket 175.

The rod 174 is ordinarily retained in its Fig. 7 position by means of a latch 176 which has a lug 177 adapted to be received into a notch 178 provided in the lower end portion of the rod 174. The latch 176 is pivotally connected at 179 with an operating rod 180 which is urged to the Fig. 7 position by a coil spring 181 which acts between the housing portion 150 of cylinder E and a plate washer 182 fixed on the extreme outer end of rod 180.

The latch 176 has an arm 183 fixed thereto which is provided with a lug 184 adapted to be received into a notch 185 provided in the plate 152. A solenoid 186 fixedly mounted on the housing of cylinder E has a core operably connected at 187 with the operating rod 180. The latch mechanism 176 is mounted on the bracket 175 (Fig. 1) for pivotal movement as indicated at 188 and when the lever 152 is in the direct drive position as shown in Fig. 9, notch 185 of plate 152 is disposed in such position that it will receive the lug 184 upon clockwise rotation of the latch mechanism about the pivot 188 from the position shown in Fig. 7 to that of Fig. 9 which is accomplished by energization of the solenoid 186 under conditions hereinafter to be explained. The upper end of rod 174 is connected to a flexible diaphragm 189 by means of a pair of retaining washers 190 and a nut 191 which engages the reduced threaded end portion of the shaft 174 which also forms an abutment for stopping the upward travel of the rod by contact of the resilient stop member 192. The diaphragm 189 is retained on the housing of cylinder E by a cover member 193 which is suitably secured to the housing and which engages the outer peripheral portion of the diaphragm 189 as clearly shown in Figs. 7 and 9.

Vacuum from the intake manifold of the motor A is adapted to be introduced into the motor E through a pipe 194 which connects the intake manifold with the inlet chamber 195 of a valve 196 (Fig. 13). The chamber 195 communicates with the upper chamber 197 of motor E through a passageway 198 when the plunger 199 of valve 196 is in the position shown by the dotted lines in Fig. 7. Under these conditions, atmospheric pressure is introduced into the lower chamber 200 of motor E through a passage 201 which is connected with an inlet opening 202 in the lower side of the valve housing by the annular chamber portion 203 which is formed by the outwardly flaring ends of the valve plunger 199.

Valve plunger 199 is operatively connected with solenoid operated rod 180 by means of a lever 204 which is biased to the left in Figure 13 by a spring 204A and which has a rounded end portion in engagement with the plunger 199 as indicated at 205 and a lower portion pivotally attached at 206 to the bracket 175, a pin 207 engaging a slot 208 provided in the rod 180 thereby to establish a lost motion operating connection to accommodate operation of the latch 176 in advance of movement of the valve plunger 199 upon movement of the solenoid operated rod 180. A switch 209 is rigidly attached to the housing E by a threaded connection 210 and has a switch operating plunger 211 which is resiliently urged into engagement with the rod 174, the latter being provided with a notch 212 for receiving the outer end of the plunger 211 when the parts are in the Fig. 9 position as will be hereinafter explained.

A second switch 213 is mounted on the coupling 142 by means of a bracket 214 and has a plunger 215 resiliently urged outwardly of the switch housing. The plate 152 has a U-shaped bracket portion 216 formed at one extremity thereof by means of a member 217 fixed thereto as shown in Fig. 12. This U-shaped portion is adapted to engage the plunger 215 of switch 213 for closing said switch when the plate 152 is shifted to high speed ratio position as illustrated in Figs. 9 and 10, the inner extending portion 218 of bracket 214 acting as a guide, as illustrated in Figs. 10 and 12. When the plate 152 is shifted into low speed ratio position, which position is almost directly below high speed position, the portion 216 engages the portion 218 as illustrated in Fig. 11, the latter in this instance acting as a guide to prevent accidental closing of switch 213.

Thus it may be seen from the description so far that the speed ratios in the underdrive transmission unit D may be selected by manipulation of the manually operable lever 122 in the conventional manner and when the transmission unit D has been manipulated into high speed ratio or direct drive position, the portion 216 of the plate 152 will close switch 213 to thereby condition the apparatus for power shifting through the intermediary of the pressure fluid operated motor E as will hereinafter be fully explained.

Referring now to Figs. 1, 2 and 24 to 28, inclusive, it may be seen that the vehicle accelerator pedal 219 which is pivoted to the toe board at 220 is connected by means of a link 221 to a lever 222 carried on the engine A by means of a bracket 223. Lever 222 which is more clearly shown in Fig. 24 is pivotally mounted on the bracket 223 at 224 and has integrally formed extensions 225, 226 and 227. The extension 225 pivotally receives the outer end of the link 221 in such manner that depression of the accelerator pedal 219 by the foot of the vehicle driver will swing the link 222 in a clockwise direction about the pivot 224. The extension 227 is connected by a Bowden cable mechanism 228 with a manually operable control member 229 carried on the dash of the vehicle as is shown in Fig. 1. The manually operable member 229 corresponds to the usual manual throttle control commonly provided and is intended to be used for adjusting the idling speed of the motor or for accelerating the vehicle under conditions when it would be inconvenient to use the accelerator pedal 219.

Extension 226 is connected by means of a link 230 with a lever 231 which is carried by one end of a rod 232, the latter in turn being carried by a hollow tube 233 which is mounted at one end in the bracket 223 and at its other end in a bracket 234 which is supported by the intake manifold 235 at the right hand side of the vehicle as illustrated in Figs. 2, 25 and 26.

The lever 231 is operatively connected to the rod 232 by means of a pin 236, the other end of the rod 232 having a crank portion 237 formed thereon which portion is pivotally connected by means of a pin 238 with a lever 239 on the lower end of which is mounted by means of a spring loaded pivotal connection 240 a thrust rod 241. This thrust rod is in turn connected to the throttle valve lever 242 of the vehicle carburetor 243 through a lost motion connection generally indicated at 244 (Fig. 28).

The latter comprises a bracket 245 having an ear 246 provided with an opening through which the rod 241 is adapted to slide. The bracket has a forward portion 247 to which is secured a guide block 248 provided with a rearwardly opening bore 249 and having a pivotal connection at 250 with the throttle control lever 242. Rod 241 has fixed thereto a collar 251 forwardly adjacent the ear 246, a preloaded spring 252 surrounding the rod 241 and acting between the block 244 and the collar 251 so that normally this spring serves as a thrust transmitting connection between rod 241 and block 248. The spring 252 functions as an overtravel spring and permits rod 241, levers 239 and 231, link 230, lever 222, link 221 and accelerator pedal 219 to have a certain amount of overtravel after lever 242 has been moved to the extremity of its throttle valve opening movement. During the overtravel of the accelerator pedal 219 and its associated linkage, spring 252 advises the driver that he is manipulating the accelerator pedal in the overtravel range by reason of the extra resistance in addition to the accelerator pedal return spring 253 afforded by this compression of spring 252 when the collar 251 moves toward the block 248. In other words, when the accelerator pedal is manipulated through its overtravel range of movement which, for the sake of convenience, will be referred to as the "kick-down" range of movement, an extra resistance is encountered by reason of the compression of spring 252 during operation of the throttle adjusting mechanism which accommodates overtravel of the accelerator pedal beyond wide open throttle position. The forward end of rod 241 is slidably disposed in the bore 249, the bracket 245 limiting the separating tendency of the rod 241 and block 248 under the action of spring 252.

Also carried on the bracket 234 at the right hand side of the engine A is an electrical solenoid 254 having a base 254' and provided with a field coil 255 and a core 256, the latter being connected by a thrust link 257 to the lever 239 through the intermediary of connection 258. A coiled compression spring 259 acts between thrust washers 260 and 261 and biases the core 256 and the operating rod 257 to the position shown in Fig. 26 wherein the connection 258 forms a fixed pivot for lever 239 about which pivot the lever is adapted to be swung under the influence of rod 232 to adjust the throttle valve lever 242 through the intermediary of the thrust link 241.

Returning to Figs. 1 and 24 for an instant, it may be seen that the lever 231 is provided with a pair of ears 262 and 263 which are respectively adapted to engage the opposite ends of an operating rod 264 of an electrical switch 265 carried by the bracket 223. The ears 262 and 263 are so disposed with respect to the switch 265 and the throttle adjusting linkage which is described above that when the accelerator pedal 219 is in throttle closed or engine idle position, the ear 263 will be in engagement with the forward end of the switch operating rod 264 to thereby open the switch. When the accelerator pedal has been depressed to the limit of its throttle opening range of movement, the spring 252 being uncompressed, the ear 262 of lever 231 is in the position shown in the dotted lines in Fig. 24 where it is about to engage the switch operating member 264 to close the switch 265 which action takes place when the accelerator pedal 219 has been depressed beyond its throttle opening range of movement and into kickdown range of movement, which action is accommodated by compression of the spring 252. Thus, it may be seen that under ordinary driving conditions, the throttle valve of the carburetor 243 is adjusted to control acceleration of the vehicle by manipulation of the accelerator pedal 219 through the intermediary of the link 221, lever 222, link 230, lever 231, rod 232, lever 239, rod 241 and lever 242. The spring 252 under such conditions functions to confine the range of movement of the accelerator pedal 219 to its ordinary throttle adjusting range of movement which is accommodated without the closure of the switch 265, the latter remaining in open position until the operating member 264 is engaged by the ear 262 of lever 231 through compression of spring 252.

Referring now to Fig. 29 where the various instrumentalities for operating the transmission have been represented schematically in a circuit diagram, the various linkages, switches, solenoids, etc. have been illustrated in the positions they assume when the transmission gears are in their neutral position with the engine A idling. From the diagram in Fig. 29, it will be seen that the vehicle battery 266 is connected to ground through a wire 267, the other side of the battery being connected through a wire 268 to the starting motor 269 and thence through ignition switch 270 and ammeter 271 to one side of the switch 213 through a wire 272. The other side of switch 213 is connected through a wire 273 with a governor operated switch mechanism generally referred to by the numeral 274. The governor mechanism 275 may be of any suitable type and is designed to be driven by the tailshaft of the transmission preferably through the speedometer connection which is commonly provided. The governor control switch mechanism 274 includes two switches 276 and 277 which are normally biased to closed position, but which are adapted to be opened by engagement therewith of a governor control lever 278, the latter being provided with a switch controlling shoe 279 which is adapted to open the switch 276 when the vehicle has reached a predetermined speed, and a shoe 280 which is adapted to open the switch 277 when the vehicle has reached a higher predetermined speed.

A wire 290 connects the switch 276 with the inner coil 291 of solenoid 186, the said coil being connected to ground through wire 292. The switch 277 is connected through a wire 293 to one side of the accelerator pedal operated kickdown switch 265, the other side of the said switch being connected by wires 294 and 294' to the outer coil 295 of solenoid 186, the said coil being connected to ground by a wire 296. The wire 294 has an extension 297 connected to one side of switch 209, the other side of said switch being connected through wire 298 to a relay 299, the other side of said relay being grounded through wire 300.

The relay 299 is adapted to operate a switch 301 which energizes, through wires 302 and 303, the throttle adjusting solenoid 254, the other side of said solenoid being grounded by means of wire 304.

The operation of the transmission will now be described. As has been previously pointed out, the transmission D may be manipulated manually in the conventional manner for starting the vehicle and for accelerating it through low and intermediate speed ratio gears to direct drive whereupon the switch 213 will be closed by the action of the portion 216 of the plate 152 upon shift of the latter to direct drive position. When the vehicle is being driven in direct drive, the notch 185 is positioned as shown in Fig. 9 where it is adapted to be engaged by the lug 184 of the latch 183, but under ordinary driving conditions, the latch 183 remains in its Fig. 7 position where the lug 177 is engaged in the notch 178 of lever 169.

It is apparent that the switch 213 when open interrupts the current supply from the battery 266 to the entire operating circuit including both coils of solenoid 186 and coil of the throttle valve adjusting solenoid 254. The switch 213 may then be considered to be the master switch for as it is closed only when the shift linkage is in direct drive position, the automatic kick-down operation of the transmission under the influence of the power cylinder E will operate only when the shift linkage is in direct drive position, the operation of the governor control switches 276, 277 and accelerator pedal overtravel operated switch 265 having no effect when the transmission is set for low, intermediate or reverse speeds.

Let it be assumed that the vehicle is being operated in direct drive at a speed greater than 5 m.p.h., which is the speed at which the governor operated switch 276 is adapted to be opened by engagement of the shoe 279 with the switch. Now, if the speed of the vehicle drops to a speed below a speed of 5 m.p.h. with the transmission mechanism D still set for direct drive, the switch 276 will close, whereupon current will flow from the battery 266 through the switch 213, wires 273 and 290 to coil 291 of solenoid 186. Energization of solenoid 186 will cause an instantaneous movement of operating rod 180 toward the right of Figs. 7 and 9, the first part of the movement of the rod 180 engaging the lug 184 of latch 183 in the notch 185 of the plate 152 to thereby lock the plate against shifting movement and the last part of the movement of operating rod 180 shifting the valve member 199 to open the lower chamber 200 of the motor E to suction which will be supplied through a pipe 194 from intake manifold 235. At the same time, the lug 177 of latch 183 will be disengaged from notch 178 and the upper chamber 197 of motor E will be open to the atmosphere through passages 198 and 202. Diaphragm 189 will thus be acted upon by differential fluid pressure and rod 174 will be thrust downwardly of Figs. 7 and 9 to the position shown in Fig. 9 and inasmuch as plate 152 is latched by engagement of lug 184 therewith, the thrust of rod 174 will be transmitted through lever 169 to lever 165 which will pivot about the axle 167; and through the intermediary of link 160, bellcrank lever 162, link 161 and lever 117, the sleeve 86 of underdrive transmission unit D will be shifted out of engagement with clutch teeth 71 and moved rearwardly to permit the roller clutch 94 to establish intermediate speed ratio drive therein.

The vehicle may then be accelerated in second or intermediate speed ratio until the operator desires to return to direct drive provided the speed at which the said return to direct drive is made is above 5 m.p.h. which is necessary to open the switch 276. The return to direct drive may then be made by release of the accelerator pedal 219 whereupon the thrust will be relieved on sleeve 86 and, as solenoid 186 is de-energized through the opening of switch 276, the spring 181 will move operating rod 180 toward the left of Fig. 9, the first part of the movement thereof due to the bias on lever 204 allowing shifting of the valve sleeve 199 to reverse the differential pressure in the chambers 197, 200 of motor E whereupon the rod 174 will be thrust upwardly to shift the sleeve 86 back to direct drive position and the lug 177 of latch 183 will engage the notch 178 to lock the parts in their Fig. 7 position. It will be noted that during the above described sequence of operation, the switch 213 remains closed due to the fact that the plate 152 is locked in its direct drive position by the latch 183.

After the parts have been returned to their Fig. 7 position, depression of the accelerator pedal 219 will cause the vehicle to be driven in direct drive. Due to the fact that the shift from direct to intermediate speed drive by closure of governor control switch 276 is made at a speed of approximately 5 m.p.h., the sleeve 86 will be easily shifted back to second speed position by the motor E without necessitating release of the drive by manipulation of the clutch pedal 69 or by other means due to the fact that the thrust on the teeth of sleeve 86 will be slight at this speed.

The aforesaid automatic shift of the transmission D back to intermediate speed position by closure of governor control switch 276 will permit the vehicle to be operated without manual operation of the shift lever 122 during all ordinary driving. The fluid coupling B which provides a slip drive between the engine A and transmission D will permit the vehicle to be started smoothly from standstill in intermediate speed ratio setting. With our improved transmission, it is contemplated that low speed ratio setting of the transmission will not be used for ordinary driving.

It is desired to point out that during the aforesaid operating sequence of the power operated rod 174, the switch 209 which is ordinarily closed, as illustrated in Fig. 29 is permitted to open when the rod 174 is moved to the Fig. 9 position due to the notch 212 which is aligned with the switch member 211 under such conditions. However, inasmuch as the switch 209 is connected through the switch 265 which is closed only upon kick-down operation of the accelerator pedal, the switch 209 has no function during automatic shift of the transmission mechanism under the control of the governor operated switch 276.

When the vehicle is being driven in direct drive under cruising conditions at a speed above 5 m.p.h., but below that speed at which the governor operated switch 277 is adapted to be opened by engagement of the shoe 280 therewith, a shift to second speed ratio drive may be made at any time for accelerating purposes by kick-down operation of the accelerator pedal. When the accelerator pedal is manipulated into kick-down position accompanied by compression of the spring 252, switch 265 will be closed by engagement of the ear 262 of lever 231 with the switch operating member 264. Current from battery 266 will thereupon flow through wire 268, ignition switch 270, ammeter 271, wire 272, switch 213, wire 273, switch 277, wire 293, switch 265, wire 294 and wire 294' to the outer coil 295 of solenoid 186 whereupon the solenoid operating rod 180 will be shifted toward the right of Fig. 7 and the sleeve 86 of transmission D will be shifted in exactly the same manner as described above. However, due to the fact that the sleeve 86 is heavily loaded when the vehicle is being operated at cruising speeds, it is necessary to release the drive through the transmission in order that the said sleeve will be unloaded for shifting. Returning to the diagram in Fig. 29, it may be seen that when the switch 265 is closed by overtravel operation of the accelerator pedal, the coil 295 of solenoid 186 is energized through the circuit just described and in addition, current travels through wire 297, switch 209, which is closed so long as rod 174 is in the Fig. 7 position, thence through wire 298 to relay 299 which is energized to thereby close the switch 301 which energizes the throttle valve operating solenoid 254 through wires 202 and 203.

When the accelerator pedal 219 is held in its kickdown overtravel position, the rod 232 will have been operated to swing the lever 239 counterclockwise of Figs. 2 and 26 to the extremity of its movement. The pivot 238 will thereupon become temporarily a fixed pivot and, upon energization of solenoid 254, the operating rod 257 will be thrust upwardly by action of the plunger 256 thereof to swing the lever 239 in a clockwise direction thereby at least partially closing the throttle valve of the carburetor 243. Immediately upon swinging of the lever 239 in a clockwise direction, the driving torque through the transmission may be reversed or at least diminished and the sleeve 86 will be unloaded whereupon the power cylinder E will cause the rod 174 to shift the sleeve 86 to second speed ratio position through the connecting linkage. When the rod 174 reaches its Fig. 9 position which corresponds to kick-down position of the transmission D, the notch 212 will receive the operating member 211 of switch 209 whereupon switch 209 will open, thereby de-energizing the relay 299 and solenoid 254 whereupon spring 259 will thrust lever 239 back to wide open throttle position. The vehicle will then be accelerated in intermediate speed ratio drive under wide open throttle conditions so long as the driver holds the accelerator pedal 219 down to the extremity of its overtravel movement. It is, however, not necessary to hold the accelerator pedal down to its extreme position in order to accelerate the vehicle in kick-down position because the ear 263 of lever 231 will not open the switch 265 until the accelerator pedal 219 is returned to engine idle position. It thus may be seen that the vehicle may be driven under perfect control by the driver in kick-down position so long as desired.

When it is desired to return to direct drive, the driver has only to release the accelerator pedal 219 fully to permit the spring 253 to return it to engine idle or throttle closed position whereupon the switch 265 will be opened, deenergizing the solenoid 186 and reversing the differential fluid pressure in motor E. The shift sleeve 86 will then be shifted back to direct drive position provided that the speed of the vehicle is above 5 m.p.h.

The governor operated switch 277 will be opened by engagement of the shoe 280 therewith whenever the speed of the vehicle is in excess of approximately 55 m.p.h. and at such speeds, overtravel of the accelerator pedal 219 will not cause operation of the kickdown mechanism. The switch 277 is provided to prevent the aforesaid kickdown operation at speeds in excess of 55 m.p.h. for the reason that an increase in motor r.p.m. at such speeds will not produce any substantial increase in car speed due to the fact that the motor is operating at such speed that an increase in speed thereof will produce no corresponding increase in torque.

Referring now to Figs. 30 to 34, inclusive, wherein a modified form of the invention has been illustrated, it will be seen that the fluid pressure operated motor E has been replaced by a solenoid S. The solenoid S is mounted on a bracket 305 which is carried by the coupling member 143 of the steering column, the mounting being similar to that of the fluid pressure operated motor E. Solenoid S is provided with outer and inner field coils 306 and 307, respectively, and a core 308 which is operatively connected by means of a rod 309 with the lever 169 through a bellcrank mechanism about to be described. The bellcrank mechanism comprises an arm 310 pivotally connected to the rod 309 at 311 and an arm 312 pivotally connected to the lever 169 at 313. The bellcrank mechanism is carried for pivotal movement at 314 on an extension of the bracket 305 and coil compression spring 315 acts between the housing of solenoid S and an abutment washer 316 to urge the core 308 outwardly of the solenoid as illustrated in Fig. 31.

The plate 152 and levers 165 and 169 are similar to those described above and used in connection with the fluid pressure actuated motor E and are designed to be latched in inoperative position to permit manual shifting of the transmission by means of the lever 122 until automatic operation of the shift mechanism is caused by energization of solenoid S. The latch mechanism in this case comprises a latch member 317 pivoted at 318 on the bracket 305. A rat trap spring 319 is provided for urging the lug 320 into engagement with a notch 321 formed in the upper end of the lever 169. Upon shifting of the mechanism manually into direct drive position, notch 322 of plate 152 will be positioned to receive lug 323 of latch 317 upon rotation of the latch clockwise about pivot 318.

Fig. 32 shows the mechanism of Fig. 31 viewed from the top of the sheet with the core 308, rod 309, spring 315 removed. The latch 317 is adapted to be operated by core 324 of a solenoid 325, the said core having a projecting rod portion 326 bearing against the latch 317 as illustrated in Fig. 31.

Solenoid 325 is provided with a switch mechanism 327 which is adapted to be closed by bridging of the insulated contacts 328, 329 upon movement of the core toward the left of Fig. 31 and to be opened upon movement of the core toward the right which action is accomplished by spring 330 upon deenergization of solenoid 325.

Solenoid S has switches 331 and 332 mounted within the cover portion thereof, the function of which will be hereinafter explained. As can be seen from Fig. 31, a switch operating rod 333 is mounted within the solenoid S in such position that upon movement of the core 308 toward the right of said figure which action is accomplished by energization of either field coil 306 or 307, the end of the core 308 will strike the lower end of rod 333 and the rod will be moved against the action of the spring 334 to open switches 331 and 332, the rod 333 having an insulated end portion 335 which is adapted to engage the lever 336 of switch 332 to open the same.

The throttle control and accelerator pedal operated kickdown mechanism used in conjunction with the solenoid operated shifting mechanism of Fig. 31 is similar to that described in connection with the fluid pressure operated shift mechanism except that a pair of switches are operated by overtravel of the accelerator pedal. Referring to Fig. 34, it may be seen that a bracket 337 carried by the bracket 223 mounts a pair of switches designated 338 and 339 respectively, and switch operating rod 340 is correspondingly provided with elongated ears 341 for operating the switches in unison. The mechanism is otherwise similar to that illustrated in Fig. 25 and the operation thereof is also similar.

Referring now to the circuit diagram of Fig. 30 where the parts have been represented in schematic form for clarity, it will be seen that upon shift of the transmission mechanism into direct drive position, the switch 213 will be closed through engagement of the switch actuating portion of the plate 152 with the plunger 215 of said switch. Closure of governor operated switch 276 therefore, will cause current to travel from the battery 266 through wire 268, ignition switch 270, ammeter 271, wire 272, switch 213, wire 273, switch 276 and wire 342 to solenoid 325 whereupon the core 324 thereof will move toward the left of Fig. 29 withdrawing the lug 320 from the notch 321 and inserting the lug 323 into the notch 322 thereby to unlatch the power shifting mechanism and to latch the plate 152 against movement. At the same time, switch 327 will be closed and current will travel from the vehicle battery through wire 343 and through switch 327 and wire 344 to the coil of a relay 345 which is provided with a switch 346. Closure of the switch 346 will then energize both field coils 306 and 307 of solenoid S through wires 347, 348 and 349.

Energization of solenoid S will cause core 308 thereof to move toward the right of Fig. 31 thereby to exert a thrust on the lever 169 through the intermediary of the bellcrank mechanism 310 whereupon the sleeve 86 of the transmission D will be shifted from direct drive position to intermediate or second speed ratio drive position. At the same time, switches 331 and 332 will be opened by movement of the core 308, opening of the switch 332 deenergizing coil 307 of solenoid S leaving coil 306 energized for holding the shift mechanism in its shifted position. Operation of the switch 331 has no function at this time.

A thermostatically actuated switch 350 is included in the circuit of field coil 307 and is designed to open by thermostatic action should the coil 307 remain energized for an undue length of time. This feature is provided to prevent over-heating of coil 307 and to provide timely reduction in the current flow through the switch 346.

The above described operation of the transmission takes place whenever the speed of the vehicle drops below 5 m.p.h. and upon speed up of the vehicle above this rate, the switch 276 will be opened by engagement of the shoe 279 therewith whereupon the solenoid 325 will be deenergized causing switch 327 to open thereby in turn deenergizing relay 345 which opens switch 346 and deenergizes coil 306 of solenoid S. Spring 315 will then return the mechanism to direct drive position upon momentary release in the drive through the transmission by release of the accelerator pedal 219.

Kickdown operation of the transmission by overtravel of the accelerator pedal 219 may be had at speeds between 5 m.p.h. and 55 m.p.h. as determined by the setting of the governor operated switch mechanism 274, overtravel of the accelerator pedal causing both switches 338 and 339 to be closed by engagement of the ear 341 therewith, whereupon current from the battery 266 will flow through switch 277, wire 351, switch 338 and wire 342 to solenoid 325 to cause shift of the sleeve 86 as described above. At the same time, relay 299 will be energized through wire 352, switch 339, wire 353 and switch 331 causing switch 301 to close thereby energizing throttle valve operating solenoid 254 and causing the throttle to be closed through the intermediary of the mechanism illustrated in Figs. 26 and 27 are described in connection therewith. As soon as the core 308 of solenoid S has moved to the extremity of its movement in shifting the sleeve 86 of transmission mechanism D to second speed position, switch 332 will be opened, thereby deenergizing coil 307 of the said solenoid and switch 331 will be opened, which action will deenergize relay 299 thereby permitting switch 301 to open which in turn deenergizes solenoid 254 which permits the throttle control linkage to restore the throttle to wide open position.

It may be seen that we have provided an automatic shifting mechanism for control of the transmission D which is controlled entirely by electrical means but which operates in a manner similar to the mechanism described in connection with the aforesaid vacuum operated shift mechanism.

Attention is directed now to Figs. 35 to 39, inclusive, wherein a further modification of the invention is illustrated, which modification includes means for overdriving the propeller shaft and interconnected control system whereby kickdown operation may be had in the underdrive mechanism D under certain conditions of vehicle operation and in the overdriving mechanism F under other conditions of vehicle operation.

Fig. 35 illustrates diagrammatically the arrangement of the transmission mechanism when the overdriving mechanism is included between the underdrive mechanism D and the driving wheels of the vehicle. Referring to Fig. 36, it may be seen that the transmission shaft 78 is the driving shaft for the overdriving mechanism F and is journalled in a bearing 360 carried by casing member 361, the shaft 78 having a rearward driving extension 362 which projects into the overdrive casing 363 and which is formed with splines 364. Engaging the splines 364 at the rear end of the driving shaft 362 is the inner member 365 of an overrunning clutch H which provides a releasable forward direct driving means from shaft 362 to tailshaft 366. As shown in Figs. 36 and 38, the inner member 365 of clutch H is formed with the usual cam faces 367 engaged by clutching rollers 368, the rollers being spaced by the usual cage 369. The outer member of the overrunning clutch H comprises a cylinder 370 formed as an enlarged forward projection of the shaft 366. When the driving shaft 362 has a forward direction of rotation imparted thereto as indicated by the arrow 371 in Fig. 38 and with the overdriving mechanism inoperative, the rollers 368 will be wedged between the inner and outer members 365 and 370, respectively, of the overrunning clutch H so that the driven shaft 366 will be driven in a forward direction with the driving shaft 362. However, in the event that the driving shaft tends to slow down relative to the driven shaft or in the event that the driven shaft tends to rotate forwardly faster than the driving shaft, the rollers 368 will be released from wedging action and such tendencies of the shafts to rotate relatively to one another will be readily accommodated.

It will be apparent that in order to drive shaft 366 in a reverse direction from the shaft 362 as when gear 79 is shifted rearwardly to mesh with the reverse idler gear 80 for driving the vehicle in reverse, some means must be provided to render the overrunning clutch H inoperative in order to establish a driving connection between these shafts. In the present embodiment of the invention, this is accomplished by reason of a shiftable clutch sleeve 372 having a set of splined teeth 373 slidably engaging the external splines 374 formed on the cylindrical member 370. The shiftable sleeve 372 is provided with an annular groove adapted to receive a portion of a shifting element 375 which is urged to the left as viewed in Fig. 36 by a coil spring 376. The sleeve 372 is formed with a set of internal clutch teeth 377 adapted upon rearward shifting movement of sleeve 372 to engage a second set of clutch teeth 378 conveniently formed as a portion of the overrunning clutch inner member 365 so that the teeth 378 are drivingly connected to the shaft extension 362.

Engaging the splines 364 forwardly of the overrunning clutch member 365 is the cylindrical hub portion 379 of a planet gear carrier 380 mounting a plurality of hollow shafts 381, one of which is illustrated in Fig. 36. Each shaft 381 journals a planet gear 382 which is in constant mesh with an internal gear or annulus 383 and also with a sun gear 384 through which the shaft extension 362 passes for rotation relatively thereto. Further details of the construction and operation of the sun gear 384 will be set forth subsequently in connection with the description of the control therefor.

Drivingly carried by the internal gear 383 is a pawl carrying cage 385 of an automatic speed responsive clutch generally designated at K. The cage 385 is rotatively centered on the hub 379 preferably through an intermediate bushing as illustrated.

The centrifugal clutch K is best illustrated in Fig. 37 wherein it will be noted that the cage 385 is formed with pairs of diametrically opposite rearwardly extending projections 386 and 387 adapted to slidably guide the centrifugal elements or pawls 388 outwardly for positive synchronous clutching with one of the slots 389 of a companion clutching structure in the form of a cylindrical shell 390 formed as an integral forward extension of the shiftable sleeve 372.

Each pawl 388 is yieldingly urged inwardly or to its retracted de-clutched position of engagement as illustrated in Fig. 37 by a coil spring 391 which acts against the abutment 392 of the pawl counterbalancing yoke portion 393. The other end of each coil spring 391 engages an abutment 394 formed as the head of an adjustable bolt 395 which slidably projects through the abutment 392 for adjustable threaded connection at 396 with a cage projection 397. Each bolt head 394 is accessible exteriorly of the centrifugal clutch by aligning one of the slots 389 with an opening 398 in which the bolt head 394 is disposed and by rotatably adjusting the bolts 395, it will be apparent that the compression of the coil springs 391 may be varied to change the load upon the pawls 388 and thereby vary the critical speed at which the pawls will fly outwardly under centrifugal force acting thereon for clutching engagement with one of the slots 389. Each pawl 388 has an outer face which is cammed at 399 so that the pawls will jump the slots 389 when the pawls are urged outwardly by centrifugal force prior to synchronizing the speeds of rotation of the cage 385 and the shell 390.

In the operation of the overdriving mechanism F as thus far described, let it be assumed for the moment that the sun gear 384 is held against rotation and that the parts are positioned as illustrated in Fig. 36. The motor vehicle is accelerated from a position of rest by manipulating the underdrive transmission mechanism D in the previously described manner until the vehicle is being driven in direct drive through the said underdrive mechanism and also for direct drive from shaft 78 through the overrunning clutch mechanism H to the driven shaft 366. Let it further be assumed that the critical speed of the automatic clutch K is such that the pawls 388 will be held inwardly by the coil spring 391 until the motor vehicle is driven at approximately 25 m.p.h. so that when the vehicle is driven at or above this speed, the pawls will be urged outwardly but cannot engage the slots 389 by reason of the relatively different speeds of rotation of the cage 385 and shell 390 in conjunction with the cammed pawl faces 399. Thus, during this forward direct drive of the motor vehicle, the slots 389 are rotating forwardly at the same speed as that of the driven shaft 366 whereas the pawls 388 together with the cage 385 and internal gear 383 are rotating forwardly at a speed faster than that of driven shaft by the amount of the planetary overdriving gear ratio incident to driving the planet cage 380 at the speed of rotation of the driving shaft 78 while holding the sun gear 384 relatively stationary.

When the motor vehicle is thus driven at or above the critical speed of operation of the automatic clutch K, the overdrive is brought into operation by a momentary reduction in the speed of the driving shaft 78 accommodated by overrun at the overrunning clutch H, this reduction in speed being conveniently brought about by the vehicle driver releasing or partially releasing the accelerator pedal 219 which is, of course, accompanied by closure of the engine throttle valve.

As the speed of rotation of the driving shaft 78 slows down, the pawls 388 will be synchronized with the shell 390 and at such times the pawls will fly outwardly for clutching engagement with one of the slots 389 respectively to thereupon couple shafts 78 and 366 by a two-way drive connection through the planetary gearing.

As hereinbefore noted, this drive connection provides a driving connection from the driving shaft 78 to the tailshaft 366 and the vehicle will be driven from the engine to the planetary gear assuming that the sun gear 384 maintains its relatively stationary condition until the speed of the motor vehicle is reduced appreciably below the aforesaid critical speed of automatic centrifugal clutch engagement at which time the coil springs 391 will operate to retract the pawls to the Fig. 37 position thereby releasing the drive through the planetary gearing and restoring the drive through the overrunning clutch H, it being apparent that the clutch will overrun during the aforesaid overdrive. By altering the adjustment of the bolts 395 or by replacing the coil springs 391 with other springs of differing values, it will be apparent that the automatic centrifugal clutch K may be made to function at any desired speed of the vehicle.

When it is desired to render the automatic clutch H inoperative, the shiftable sleeve 372 is shifted rearwardly to engage clutch teeth 377 thereof with the driving shaft clutch teeth 378 to thereby directly couple shafts 78 and 366 together for two-way drive. At the same time, the slots 389 will be shifted rearwardly out of radial alignment with the pawls 388 so that the pawls cannot move outwardly to engage the slots coupled with the circumstance that the pawl cage 385 and shell 390 cannot be synchronized with the shafts 78 and 366 coupled for a two-way drive and with the sun gear 384 held stationary.

As will be presently made apparent, we have provided a secondary controlling means for the overdrive mechanism by reason of which the sun gear 384 may be released at the will of the vehicle driver by means of a kickdown cycle of operation similar to that previously described in connection with the control of the underdrive mechanism D and since the sun gear 384 takes the reaction of the overdrive, it will be apparent that when the sun gear is allowed to freely rotate, the overdrive mechanism will be rendered inoperative even in the event that the centrifugal clutch K is engaged at the time of the release of the sun gear.

We have also provided means responsive to rearward shift of the main transmission gear 79 into mesh with the reverse idler gear 80 for causing a rearward shift of the sleeve 372 to couple shafts 78 and 366 for the aforesaid two-way drive therebetween. The gear 79 is shiftable rearwardly to engage reverse idler gear 80 by a rail 83 to which is connected the yoke 82 as previously described. In the present modification of the invention, as the rail 83 is moved rearwardly, it engages the adjacent end portion of the shifting element 375 to move the latter rearwardly against the action of the spring 376. The sleeve 372 is thus moved rearwardly to engage clutch teeth 377 thereof with the driving shaft clutch teeth 378 to thereby directly couple shafts 78 and 366 for two-way drive therebetween. The rail 83 is maintained in the position to which it has been moved by the ball detent arrangement previously described. Upon movement of the rail 83 to disengage gears 79 and 80, the sleeve 372 is returned to the position shown in Fig. 36 by spring 376.

Referring particularly to Figs. 36 and 39, a collar indicated generally at 400 is splined on the sun gear 384 and has an annular radially outwardly extending portion 401 provided with a plurality of circumferentially spaced notches 402. The rear face of collar 400 abuts the adjacent end face of the sun gear teeth and is retained in position by a ring 403 as shown in Fig. 36. A retractable pawl 404 slidably mounted intermediate a pair of fixed wear plates 405 and 406 extending through an opening 407 in the intermediate member 361 is adapted to engage one of the slots 402 for releasably holding the sun gear 384 against rotation. A split ring 408, preferably of spring steel, resiliently grips the outer periphery of the main body of collar 400 to be oscillated thereby as will be presently made apparent. The ends of the ring 408 are circumferentially spaced to provide an opening adapted to register with the opening 407 in the part 361 for accommodating engagement of the pawl 404 in a notch 402. One end portion of ring 408 has a radially outwardly extending ear 409 disposed intermediate the plates 405 and 406 and which overlaps a portion of pawl 404 having a reduced thickness as indicated at 410 when the pawl is engaged in a slot for holding the sun gear against rotation. Oscillating movement of ring 408 is limited by engagement of ear 409 with the wear plates 405, 406.

The pawl 404 is actuated by a rod 411 disposed in an opening 412 in a laterally extending portion 413 of the adapter plate 361. The rod 411 has a ball end portion 414 received in a correspondingly shaped socket 415 in pawl 404, the latter having a slot communicating with the socket for receiving a portion of the rod 411.

The rod 411 projects outwardly beyond the portion 413 through an opening in a cover plate 416 fixed by screws 417 to the end face of an enlarged portion of 413. The wall defining the opening in plate 416 extends radially inwardly beyond the wall defining the opening 412 and provides an abutment for a washer 418. The latter provides an abutment for one end of a coil spring 419 surrounding the rod 411, the other end of the spring abutting the pawl 404. The spring 419 yieldably urges the pawl to a position for engagement with one of the notches 402 and accommodates retraction of the pawl to a position of disengagement from said notches.

Operation of the holding means heretofore described for the sun gear of the planetary gearing is controlled by an electrically operated prime mover motor herein illustrated as a solenoid and generally designated by the numeral 420. The solenoid is contained within a casing 421 having a lateral flange secured to the plate 416 by bolts 422. Contained within the casing 421 is the usual solenoid coil 423 spaced from the plate 416 by the spacer 424 having a central opening accommodating the solenoid core 425. The latter has an opening 426 therein through which extends the pawl actuator rod 411 and within which is disposed a coil spring 427 surrounding the rod 411. One end of the spring 427 abuts a washer 428 fixedly mounted on rod 411, the washer abutting the adjacent face of the radially inwardly extending portion of the end wall of core 425 which portion has an opening 429. The opposite end of spring 427 seats against an abutment 430 secured to the core 425. The relation of spring 419 to spring 427 is such that when the latter is compressed by movement of the core 425 to the left as indicated in Fig. 39, the built up energy is sufficient to move the rod 411 and pawl 404 against the resistance of spring 419 for retracting the pawl as will be presently apparent.

Carried by and movable with the solenoid core 425 is a metallic rod 431 having a portion thereof projecting axially beyond the adjacent end face of the core and extending into an opening 432 in the end face of casing 421. The rod 431 has an end piece 433 of insulating material attached to the end thereof and is adapted upon movement of core 425 in response to energization of the solenoid to engage an oscillatable switch blade arm 434 which is connected into the engine ignition system as hereinafter set forth. The switch blade 434 is carried by an insulating mounting 435 suitably attached to the end face of casing 421. Engagement of the end portion 433 of rod 431 with the oscillatable switch blade arm 434 will swing the said arm into contact with a second switch blade 436 which is carried by a fitting 437 mounted on the end face of casing 421 by means of an insulating block 438. The switch blades 434 and 436 are formed of flexible metal and are so mounted that they are urged to the position shown in Fig. 39 by means of spring tension.

The end face of casing 421 has an opening 439 accommodating the free end of rod 411 which is provided with an electrically insulated extremity 440 engageable with the switch blade 436 for the purposes hereinafter set forth, it being understood that the rod 431 is adapted, upon energization of the solenoid, to engage the switch blade 434 prior to engagement of the insulated end 440 of the rod 411 with the switch blade 436. As will be presently apparent, the rod 431 is moved to engage the switch blade 434 and move it into contact with the switch blade 436 establishing a circuit through a relay 299 which controls the energization of the throttle closing solenoid 254, while subsequent engagement of the insulated extremity 440 of rod 411 with the switch blade 436 interrupts said circuit and deenergizes the solenoid 254. Thus it may be seen that the solenoid core 425 and rod 431 constitute a leader part which, upon energization of the core, moves to establish an electrical circuit which causes the throttle to be closed and during such movement the spring 426 is energized to actuate the rod 411 for releasing the pawl 404, the rod 411 constituting a follower which acts to deenergize the aforesaid circuit and cause the throttle to be moved back to wide open position when the pawl 404 is released.

The switch blades 434 and 436, as aforesaid, are connected in the circuit of the relay 299 which controls energization of the throttle closing solenoid 254 through the circuit formed by wires 268 and 302 which lead from the vehicle battery 266 to one of a set of switch contact points 301, the other contact point of said set being connected to the solenoid 254 through wire 303, the other side of the solenoid being grounded through wire 304. The circuit controlling solenoid 254 is otherwise similar to that shown in Fig. 29 with the addition thereto of an extra kickdown switch 447 which is adapted to be actuated by the switch operating arm 222 simultaneously with the switch 265. Current is conducted from the terminal on the starting motor 269 through ignition switch 270 and ammeter 271 by means of a wire 272 to one side of the switch 213, the other side of switch 213 being connected through wire 273 to the middle contact member 448 of governor controlled switch 277'. As can be seen from Fig. 39, governor controlled switch 277' has a contact member 449 connected through a wire 450 with switch 447 and a contact member 451 connected by means of a wire 452 with switch 265. Thus, it is apparent that current travelling through the wire 273 will flow through either the switch 265 or the switch 447 upon overtravel kickdown movement of the accelerator pedal 219 depending upon whether the movable contact member 448 of switch 277' is in engagement with contact member 449 or contact member 451 thereof. The position of contact member 448 of switch 277' is controlled by governor mechanism 274 which is driven by the speedometer drive gear 453 (Fig. 36).

In the transmission arrangement just described and illustrated in Figs. 35 to 39, inclusive, the operation of the underdrive mechanism D is exactly the same as that previously described in connection with Figs. 1 to 29, inclusive, that is, after the transmission underdrive unit D has been manipulated into direct drive position by operation of the manually operable lever 122, closure of switch 213 will condition the apparatus for power shifting through the intermediary of the pressure fluid operated motor E and when the speed of the vehicle drops to a speed below 5 m.p.h., the governor operated switch 276 will close whereupon current will flow from the battery 266 through the switch 213, wire 273, switch 276 and wire 290 to coil 291 of solenoid 186 causing operation of fluid pressure motor E to shift the underdrive mechanism D into intermediate speed ratio drive position. Acceleration of the vehicle in intermediate speed ratio drive above the speed of 5 m.p.h. which is necessary to open the switch 276 will permit a return to direct drive upon release of the accelerator pedal 219 as has been fully described.

The transmission mechanism illustrated in Figs. 35 to 39, inclusive, differs, however, in operation of the kickdown mechanism in that the governor controlled switch 277' operates to break the kickdown circuit through switch 265 when a speed of approximately 40 m.p.h. has been reached and to establish a kickdown circuit through the switch 447 which controls the overdrive kickdown solenoid 420. As is apparent from Fig. 39, one side of switch 447 is connected by means of wire 443 with one terminal 444 of overdrive kickdown solenoid 420, the other side of coil 423 being connected to ground through terminal 445 and wire 446.

Upon overtravel operation of the accelerator pedal 219 when the vehicle is travelling at a speed above 40 m.p.h., both switch 265 and switch 447 will be actuated to closed position by switch operating arm 222. Because of the fact that contact member 448 of governor controlled switch 277' is in engagement with contact member 449 at this speed, closure of switch 265 will not effect operation of underdrive kickdown solenoid 186. However, closure of switch 447 will cause energization of the overdrive kickdown solenoid 420 through wire 443 thereupon causing movement of core 425 toward the left of Fig. 39 compressing spring 427 and engaging switch blade 434 with switch blade 436 whereupon relay 299 will be energized through wires 453 and 454 thereupon closing switch 301 and energizing the throttle closing solenoid 254.

As soon as solenoid 254 has closed, or partially closed, the vehicle throttle valve, the diminution in drive produced thereby will relieve the thrust on pawl 404 and permit the spring 426 to move the latter out of holding engagement with the overdrive sun gear thereupon causing the vehicle to be driven in direct drive speed ratio upon restoration of the throttle to wide open position which is, of course, accomplished by the end 440 of pawl operating rod 411 engaging the switch blade 436 and opening the circuit to relay 299 thereby causing solenoid 254 to be deenergized. The vehicle may be driven in direct drive speed ratio as long as desired and overdrive may be reestablished at any time provided that the speed of the vehicle is above 40 m.p.h. which is the speed necessary to maintain the contact member 448 of switch 277' in engagement with contact member 449 thereof, by momentarily releasing the accelerator pedal 219 whereupon switch 447 will be opened, deenergizing overdrive kickdown solenoid 420 and permitting spring 419 to move the pawl 404 into engagement with one of the slots 402 which action occurs in the following manner.

While the spring 419 acts to urge the pawl 404 radially inwardly to engage a slot 402 immediately upon deenergization of the solenoid 420, such engagement is prevented by blocker ring 408 and can occur only by oscillation of the ring to a non-blocking position. This position of the blocker ring is accommodated by rotation of the sun gear in a counter-clockwise direction which is accomplished by the aforesaid momentary release of the accelerator pedal thus permitting the engine to decelerate whereby the driven annulus 383 is permitted through operation of the overrunning clutch H to overrun the shaft 362, that is to say, the speed of the driven member 383 as well as that of the shaft 366 exceeds the speed of the driving member and the driven annulus tends to drive the planet gears. This action is commonly referred to as "coasting" and when the transmission is so operating, the planet gears 382 are rotated in a clockwise direction, the sun gear being, of course, free from rotation, the drive thereof being counter-clockwise. When the sun gear is so rotated, it oscillates the blocker ring 408 in a corresponding direction, the radially extending ear 409 engaging the plate 405 to limit movement thereof. The ring 408 is thus positioned to permit the pawl 404 to engage one of the slots 402 under the action of the spring 419.

Upon reengagement of the pawl 404 with one of the slots 402, the vehicle will again be in overdrive ratio and will continue to be driven in this ratio until the speed thereof drops below the cut-in speed of the centrifugal clutch K (which in this instance is approximately 25 m.p.h.) whereupon the pawls 388 will disengage from the shell 390 under the pressure of the springs 391 and the vehicle will then be driven in direct drive ratio until the speed thereof drops to 5 m.p.h. or the switch 265 is closed by kickdown operation of the accelerator pedal thereby causing the fluid pressure motor E to shift the underdrive mechanism D to intermediate speed ratio.

It will be understood that the all electric underdrive arrangement shown in Figures 30 to 34 inclusive could be employed with the kickdown overdrive of the arrangement above described with respect to Fig. 39 to obtain the advantages thereof and such a combination is accordingly contemplated by the present invention.

From the foregoing, it may be seen that we have provided a transmission which is capable of great flexibility and which is adapted to operate automatically under all ordinary driving conditions to provide the correct driving ratio in response to the will of the driver.

Having thus described specific embodiments of our invention, we wish it to be understood that we do not thereby intend to limit the same, the invention in its broader aspects being defined in the claims appended hereto.

We claim:

1. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; a control member operable by the driver for governing the speed of the vehicle; means operatively associated with said shiftable members and said control member for effecting shift of one or the other of said shiftable members upon operation of said control member; and means operatively associated with said last means for selectively controlling step up in speed ratio drive by said first shiftable member in accelerating the vehicle from rest and step downs in speed ratio drive of said first and second shiftable members.

2. In a power transmission for driving a vehicle having an engine; a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; a control member operable by the driver for governing the speed of the vehicle; means operatively associated with said shiftable members and said control member for effecting shift of one or the other of said shiftable members upon operation of said control member; and vehicle-speed-responsive means operatively associated with said last means for selectively determining which of said shiftable members shall be shifted.

3. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; a manually operable control member adapted for operation by the driver through a normal range of movement for adjusting the throttle of said engine and through an additional overtraveling range of movement beyond said normal range; means operable in response to overtravel movement of said control member for shifting one or the other of said shiftable members; and vehicle-speed-responsive means operatively associated with said shifting means for selectively determining which of said shiftable members shall be shifted.

4. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; a manually operable accelerator pedal for adjusting the throttle of said engine; said pedal having a normal range of movement for adjusting the throttle between closed and open position and a further range of movement beyond wide open throttle position; means operable in response to movement of said pedal in said further range for shifting one or the other of said shiftable members; and means operatively associated with said shifting means for selectively controlling step up in speed ratio drive by said first shiftable member in accelerating the vehicle from rest and stepdowns in speed ratio drive of said first and second shiftable members.

5. In a power transmission for driving a vehicle having an engine; a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; power means respectively operatively associated with said shiftable members for shifting the same; vehicle speed responsive means for controlling said power means, said controlling means being automatically operable to effect shift to said slower speed ratio in response to the vehicle speed dropping below a predetermined value.

6. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; power means respectively operatively associated with said shiftable members for shifting the same; vehicle speed responsive means for controlling said power means, said controlling means being automatically operable to effect shift to said slower speed ratio in response to the vehicle speed dropping below a predetermined value; and manually operable means adapted for operation by the driver for effecting shift to said slower speed ratio at vehicle speeds above said predetermined speed.

7. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; power means respectively operatively associated with said shiftable members for shifting the same; manually operable means adapted for operation by the driver for controlling said power means; vehicle speed responsive means operatively associated with said manual means for determining which of said members shall be shifted upon operation of said manual means.

8. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; power means respectively operatively associated with said shiftable members for shifting the same; manually operable means adapted for operation by the driver for controlling said power means; vehicle speed responsive means operatively associated with said manual means for determining which of said members shall be shifted upon operation of said manual means; said vehicle speed responsive means including means for automatically effecting a shift from 1 to 1 ratio to said slower speed ratio in response to the vehicle speed dropping below a predetermined value.

9. The combination set forth in claim 7 wherein said shiftable members when drivingly engaged are subject to thrust transmission which tends to resist shifting thereof; and means operable upon energization of said power means for momentarily interrupting the drive of the vehicle engine thereby to relieve said thrust transmission.

10. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; a manually operable control member operable by the driver for adjusting the throttle of the engine; means controlled by said control member and operable only when the vehicle throttle is wide open for shifting one or the other of said shiftable members; and vehicle speed responsive means operatively associated with said shifting means for selectively determining which of said shiftable members shall be shifted.

11. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; means, including a first solenoid, operatively connected to said first shiftable member for shifting the same; a second solenoid operatively connected to said second shiftable member for shifting the same; a source of electrical energy; electric-circuit-forming means connecting said source with said respective solenoids; an accelerator pedal for controlling the engine of said vehicle; a pair of switches respectively connected to said solenoids and adapted to be closed in response to predetermined movement of said pedal; and vehicle speed responsive means for selectively connecting said switches with said source.

12. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; means, including a first solenoid, operatively connected to said first shiftable member for shifting the same; a second solenoid operatively connected to said second shiftable member for shifting the same; a source of electrical energy; electric-circuit-forming means connecting said source with said respective solenoids; an accelerator pedal for controlling the engine of said vehicle; a pair of switches respectively connected to said solenoids and adapted to be closed in response to predetermined movement of said pedal; and vehicle speed responsive means for selectively connecting said switches with said source whereby said first shiftable member is adapted to be shifted at relatively low vehicle speeds and said second shiftable member is adapted to be shifted at relatively high vehicle speeds.

13. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; means, including a first solenoid, operatively connected to said first shiftable member for shifting the same; a second solenoid operatively connected to said second shiftable member for shifting the same; a source of electrical energy; electric-circuit-forming means connecting said source with said respective solenoids; an accelerator pedal for controlling the engine of said vehicle; a pair of switches respectively connected to said solenoids and adapted to be closed in response to predetermined movement of said pedal; and vehicle speed responsive means for selectively connecting said switches with said source whereby said first shiftable member is adapted to be shifted at relatively low vehicle speeds and said second shiftable member is adapted to be shifted at relatively high vehicle speeds; and means operable in response to energization of either of said solenoid circuits for momentarily relieving the drive through said transmission thereby to facilitate shift of the shiftable member.

14. The combination set forth in claim 13 wherein the drive relieving means comprises a third solenoid operatively connected to the engine throttle and adapted upon energization thereof to momentarily close said throttle.

15. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; means including electrically energized control means for effecting shift of said respective shiftable members; governor operated switch means responsive to the speed of the vehicle for controlling operation of said electrically energized means; said switch means being arranged such that said first shiftable member is shifted to establish said slower speed driving ratio when the vehicle speed drops to a predetermined value.

16. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; means including electrically energized control means for effecting shift of said respective shiftable members; manually operated switch means for controlling operation of said electrically energized means; governor operated switch means responsive to the speed of the vehicle connected in series with said manually operated switch means; said governor operated switch means being arranged such that operation of said manually operated switch means will effect shift of said first shiftable member at relatively low vehicle speeds and shift of said second shiftable member at relatively high vehicle speeds.

17. In a power transmission for driving a vehicle having an engine, a drive structure adapted to receive drive from the engine; a driven structure adapted to drive the vehicle; means including a first shiftable member for driving the driven structure from the drive structure at 1 to 1 speed ratio or at a slower speed ratio; said means also including a second shiftable member for driving the driven structure from the drive structure at said 1 to 1 speed ratio or at a higher speed ratio; means including electrically energized control means for effecting shift of said respective shiftable members; manually operated switch means for controlling operation of said electrically energized means; governor operated switch means responsive to the speed of the vehicle connected in series with said manually operated switch means; said governor operated switch means being arranged such that operation of said manually operated switch means will effect shift of said first shiftable member at relatively low vehicle speeds and shift of said second shiftable member at relatively high vehicle speeds; said governor operated switch means being also operable to automatically effect shift of said first shiftable member without operation of said manually operable switch means in response to drop in vehicle speed below a predetermined value.

18. In a power transmission for driving a vehicle having an engine, means including a pair of shiftable members for driving the vehicle in a plurality of different speed ratios; power means for shifting said shiftable members thereby to effect a change in the driving ratio; manually operable throttle control means for controlling said power means; vehicle speed responsive means operatively associated with said power means for selectively determining which of said shiftable members shall be shifted in response to operation of said manually operable control means, and means operable in conjunction with said manual throttle control means for overruling said vehicle speed responsive means.

19. In a power transmission for driving a vehicle having an engine, means including a pair of shiftable members for driving the vehicle in a plurality of different speed ratios; power means for shifting said shiftable members thereby to effect a change in the driving ratio; an accelerator pedal for controlling the throttle of said engine; means operable by said pedal when said throttle is in substantially wide open position for controlling operation of said power means; and vehicle speed responsive means operatively associated with said power means for selectively determining which of said shiftable members shall be shifted in response to operation of said pedal, said accelerator pedal operable means being adapted to overrule said vehicle speed responsive means when obtaining downshifts.

20. In a power transmission for driving a vehicle having an engine, means including a pair of shiftable members for driving the vehicle in a plurality of different speed ratios; power means for shifting said shiftable members thereby to effect a change in the driving ratio; an accelerator pedal for controlling the throttle of said engine; means operable by said pedal when said throttle is in substantially wide open position for controlling operation of said power means; and vehicle speed responsive means operatively associated with said power means for selectively determining which of said shiftable members shall be shifted in response to operation of said pedal; the operation of said speed responsive means being such that shift from the highest driving ratio to a lower ratio may be obtained when the vehicle is traveling at a speed in excess of a predetermined speed and shift from said lower ratio to a still lower ratio may be obtained when the vehicle is traveling at a speed below said predetermined speed, said accelerator pedal operable means being adapted to overrule said vehicle speed responsive means when obtaining downshifts.

21. In a motor vehicle having an engine, transmission mechanism operable to provide a drive from the engine to the vehicle driving wheels; said mechanism including positively engageable drive control elements cooperable for relative engagement therebetween to establish said drive and for relative disengagement therebetween to release said drive; said elements when relatively engaged being subject to thrust transmission therebetween during said drive so as to resist relative disengagement thereof to release said drive until said thrust-transmission is relieved; power operated shift means for engaging and disengaging said drive control elements; a throttle valve for said engine; control means operable by the driver for adjusting said valve between closed and open position; means including a solenoid associated with said control means for actuating said throttle valve in throttle-closing direction to relieve said thrust transmission; and a switch operable by said control means between open and closed positions for controlling operation of said shift means and solenoid, said switch when operated to one of said positions by said control means being adapted to cause, said means including said solenoid, and said power operated shift means to be actuated to effect throttle closing movement of said throttle and disengagement of said drive control elements.

22. In a motor vehicle having an engine, transmission mechanism operable to provide a drive from the engine to the vehicle driving wheels; said mechanism including positively engageable drive control elements cooperable for relative engagement therebetween to establish said drive and for relative disengagement therebetween to release said drive; said elements when relatively engaged being subject to thrust transmission therebetween during said drive so as to resist relative disengagement thereof to release said drive until said thrust-transmission is relieved; power operated shift means for engaging and disengaging said drive control elements; a throttle valve for said engine; control means operable by the driver for adjusting said valve between closed and open position; means including a solenoid associated with said control means for actuating said throttle valve in throttle-closing direction to relieve said thrust transmission; a switch operable by said control means between open and closed positions for controlling operation of said shift means and solenoid, said switch when operated to one of said positions by said control means being adapted to cause, said means including said solenoid, and said power operated shift means to be actuated to effect throttle closing movement of said throttle and disengagement of said drive control elements; and a second switch for controlling restoration of said throttle valve to its former position when said drive control elements are relatively disengaged.

23. In a motor vehicle having an engine, transmission mechanism operable to provide a drive from the engine to the vehicle driving wheels; said mechanism including positively enegageable drive control elements cooperable for relative engagement therebetween to establish said drive and for relative disengagement therebetween to release said drive; said elements when relatively engaged being subject to thrust transmission therebetween during said drive so as to resist relative disengagement thereof to release said drive until said thrust-transmission is relieved; power operated shift means for engaging and disengaging said drive control elements; a throttle valve for said engine; control means operable by the driver for adjusting said valve between closed and open position; switch means having a normally open position and a closed position, operable to said closed position upon movement of said control means to substantially wide open throttle position for causing operation of said shift means to disengage said drive control elements; and means including a solenoid also actuated by operation of said switch means to closed position for at least partially closing said throttle valve to relieve said thrust transmission and permit disengagement of said drive control elements.

24. In a motor vehicle having an engine and a power transmission provided with a shiftable member adapted for shifting to establish different speed ratio drives, a throttle valve for controlling said engine; an accelerator pedal; link means connecting said valve and said pedal: switch means having an open position and a closed position operable to one of said positions from the other thereof upon operation of said throttle valve to substantially wide open position; power shifting means operable when said switch means is established in said one position for shifting said shiftable member; means operable upon establishment of said switch means in said closed position for relieving the drive of said engine to facilitate said shifting the said drive relieving means comprising prime mover means connected to said link means and operable to move said throttle valve toward closed position and electrical relay means controlling said prime mover means.

25. In a power transmission for driving a vehicle having an engine, a transmission mechanism having a member adapted for shifting to provide a plurality of different speed ratio drives between the engine and the vehicle drive wheels; manually operated means for shifting said member to establish said drives; power operated means for shifting said member, and electrical means for controlling said power operated means operable to permit shift of said member by said power operated means only after said member has been shifted to a predetermined drive position by said manually operated means.

26. In a power transmission for driving a vehicle having an engine, a transmission mechanism having a member adapted for shifting to provide a plurality of different speed ratio drives between the engine and the vehicle drive wheels; manually operated means for shifting said member to establish said drives; power operated means for shifting said member, means for controlling said power operated means operable to permit shift of said member by said power operated means only after said member has been shifted to a predetermined position by said manually operated means; and means for locking said manually operated means against shifting operation from manually operated means against shifting operation from its position corresponding to shift of said member to said predetermined position during operation of said power operated means.

27. In a power transmission for driving a vehicle having an engine, a transmission mechanism having a member adapted for shifting to provide a plurality of different speed ratio drives between the engine and the vehicle drive wheels; manually operated means for shifting said member to establish said drives; power operated means for shifting said member, means for controlling said power operated means operable to permit shift of said member by said power operated means only after said member has been shifted to a predetermined position by aid manually operated means; means for locking said manually operated means against shifting operation during operation of said power operated means comprising latch means operable into locking position with respect to said manual means and power means to actuate said latch means prior to the shifting operation of said power means.

28. In a power transmission for driving a vehicle having an engine, a transmission mechanism having a member adapted for shifting to provide a plurality of different speed ratio drives between the engine and the vehicle drive wheels; manually operated means for shifting said member to establish said drives; power operated means for shifting said member to establish said drives; means for preventing operation of said power operated means during operation of said manually operated means; latch means for preventing operation of said manually operated means during operation of said power operated means.

29. In a power transmission for driving a vehicle having an engine, a transmission mechanism having a member adapted for shifting to provide a plurality of different speed ratio drives between the engine and the vehicle drive wheels; manually operated means for shifting said member to establish said drives; power operated means including means for shifting said member to establish said drives; latch means for preventing operation of said power operated shifting means during operation of said manually operated means; latch means for preventing operation of said manually operated means during operation of said power operated means; and means operable in advance of shifting movement of said power operated shifting means for unlatching said power operated shifting means and latching said manually operated means.

30. In a power transmission for driving a vehicle having an engine, a transmission mechanism having a member adapted for shifting to provide a plurality of different speed ratio drives between the engine and the vehicle drive wheels; manually operated means for shifting said member to establish said drives; power operated means for shifting said member to establish said drives; other latch means for preventing shift of said member by said power operated means during operation of said manually operated means; latch means for preventing operation of said manually operated means during operation of said power operated means; means normally maintaining said latch means in such position that said manually operated means is unlatched and said other latch means is positioned to prevent shift of said member by said power operated means; and means operable automatically in advance of energization of said power operated means for conditioning said power operated means for shifting said member and latching said manually operated means.

31. In a power transmission for driving a vehicle having an engine, a transmission mechanism having a member adapted for shifting to provide a plurality of different speed ratio drives between the engine and the vehicle drive wheels; manually operated means for shifting said member to establish said drives; power operated means including a fluid pressure motor for shifting said member; a valve for controlling said motor; a solenoid for operating said valve and adapted upon energization thereof to move said valve to motor energizing position; latch means normally latching said power operated means against shifting movement and adapted upon movement to unlatching position to latch said manually operated means against shifting movement; and an operating connection between said latch means and said solenoid whereby said latch means is moved to unlatching position relative to said power operated means upon energization of said solenoid.

32. In a power transmission for driving a vehicle having an engine, a transmission mechanism having a member adapted for shifting to provide a plurality of different speed ratio drives between the engine and the vehicle drive wheels; manually operated means for shifting said member to establish said drives; power operated means including a fluid pressure motor for shifting said member; a valve for controlling said motor, said valve including an element movable to cause energization of said motor; latch means having a first position latching said power operated means only against shifting movement and a second position latching said manually operated means only against shifting movement; and an operating connection between said latch means and said movable valve element whereby said latch means is moved to second position upon movement of said element to motor energizing position.

33. In a power transmission for driving a vehicle having an engine, a transmission mechanism having a member adapted for shifting to provide a plurality of different speed ratio drives between the engine and the vehicle drive wheels; manually operated means for shifting said member to establish said drives; power operated means including a solenoid for shifting said member; latch means having a first position latching said power operated means only against shifting movement and a second position latching said manually operated means only against shifting movement; a second solenoid operatively connected to said latch means; switch means adapted for operation by said second solenoid for energizing said first solenoid, said switch means being operable to circuit closing position only after said latch means has been moved to unlatch said power operated means.

34. In a power transmission for driving a vehicle having an engine, a shiftable member adapted for shifting to provide different speed ratio drives from the engine to the vehicle driving wheels; means for shifting said member including a first lever swingable about a fixed pivot; manually operated means for swinging said first lever; a second lever pivoted to said first lever at a point remote from the axis of swinging thereof; an operating connection between said second lever and said shiftable member; a third lever pivoted to said second lever at a point remote from the pivot connection thereof with said first lever; power operated means connected to said third lever adapted for operation to swing said second lever about its pivot connection with said first lever; means for latching said third lever against movement to permit shifting of said shiftable member by said manually operated means; and means to latch said first lever against movement to permit shifting of said shiftable member by said power operated means.

35. In a power transmission for driving a vehicle having an engine, a shiftable member adapted to be shifted to a plurality of positions for establishing a plurality of different drives of different speed ratios and directions; a manually operable shift lever for controlling said member; link means positively connecting said shift lever and said member; and power operated means positively connected to said link means for shifting said member only after said member has been shifted to a predetermined position by said manually operable shift lever and while maintaining connection of said link means with said lever.

36. In a power transmission for driving a vehicle having an engine, a shiftable member adapted to be shifted to a plurality of positions for establishing a plurality of different drives of different speed ratios and directions; a manually operable shift lever for controlling said member; link means connecting said shift lever and said member; power operated means connected to said link means for shifting said member; electrically energized means for controlling said power means; and switch means operably associated with said electrically energized means and said link means for preventing energization of said electrically energized means except when said link means is in a predetermined position.

37. In a motor vehicle having an engine, a steering column and a transmission mechanism including a member shiftable to a plurality of positions to establish different speed ratio drives, shift mechanism carried by said steering column and adapted for manual operation to adjust said shiftable member; a prime mover motor carried by said steering column and connected to said shift mechanism whereby said shiftable member may be shifted by power means; said prime mover motor being normally inoperable, and means operated by said shift mechanism during manual operation thereof for rendering said motor operable when said mechanism is manually shifted to a selected ratio setting.

38. In a motor vehicle transmission mechanism, a member shiftable either by manual means or by power means for establishing a plurality of speed ratio drives; manual means for shifting said member; power means for shifting said member including a first solenoid; latch means for latching either said manual or said power means against operation while the other is being operated; a second solenoid connected with said latch means for operating the same; means for energizing said second solenoid including means for simultaneously interrupting the drive of the vehicle motor; a switch adapted for operation upon latch-operating operation of said second solenoid for causing energization of said first solenoid, and a switch adapted for operation by said first solenoid upon operation thereof to shift said member for restoring the drive of said motor.

39. The combination set forth in claim 38 wherein the means for energizing said second solenoid is operable either by manual means or by vehicle speed responsive means.

40. In a motor vehicle power transmission mechanism, a member adapted to be shifted by power actuated means for establishing a plurality of speed ratio drives; said power actuated means comprising a solenoid having a pair of field coils either of which upon energization thereof will cause shift of said member; governor operable means operable in response to the speed of the vehicle for energizing one of said coils; and manually operable means operable by the driver for energizing the other of said coils independently of said governor means for obtaining a downshift from a higher to a lower speed ratio drive.

41. In a motor vehicle power transmission mechanism, a member adapted to be shifted by power actuated means for establishing a plurality of speed ratio drives; said power actuated means comprising a solenoid having a pair of field coils either of which upon energization thereof will cause shift of said member; governor operable means operable in response to the speed of the vehicle for energizing one of said coils; manually operable means operable by the driver for energizing the other of said coils independently of said governor means for obtaining a downshift from a higher to a lower speed ratio drive; and means operable in response to energization of one of said coils only for momentarily reducing the transmission of torque through said mechanism.

42. In a power transmission for driving a vehicle having an engine, a drive structure adapted to receive drive from the engine, a driven structure adapted to drive the vehicle, means including a first shiftable member for establishing drive of the driven structure from the drive structure at the speed of the drive structure or in a slower speed ratio drive relative thereto, said means also including a second shiftable member for establishing drive of the driven structure from the drive structure at the said speed thereof or in a different speed ratio drive relative thereto, means, including an electrically energizable device, operatively connected to said first shiftable member for shifting the same, means including an electrically energizable device operatively connected to said second shiftable member for shifting the same, a source of electrical energy, electrical circuit forming means connecting said devices with said source, operator responsive means for controlling the vehicle engine, vehicle speed responsive means for selectively actuating said devices to effect automatic shift of the shiftable members to establish a predetermined speed ratio drive aforesaid and switch means for selectively actuating said devices in response to movement of the said operator responsive means to a predetermined position and under control of said speed responsive means to effect shift of said shiftable members from a higher to a lower speed ratio drive establishing position.

43. In a motor vehicle having an engine, transmission mechanism to provide a drive from the engine to the vehicle driving wheels, said mechanism including positively engageable drive control elements co-operable for relative engagement therebetween to establish said drive and for relative disengagement therebetween to release said drive, said elements when relatively engaged being subject to thrust transmission therebetween during said drive so as to resist relative disengagement thereof to release said drive until said thrust transmission is relieved, power operated shift means for establishing and releasing said drive, a throttle valve for feeding fuel to the engine, means under control of the driver operable to effect actuation of said power shift means for conditioning said drive control elements to release said drive, and means simultaneously operable by said drive controlled means when effecting said drive release for actuating said throttle reducing the extent of fuel delivery to the engine thereby to reduce but not to interrupt the power delivery of the engine whereby to effect release of said thrust transmission and thereby release of said drive.

44. In a motor vehicle having an engine and a power transmission, a throttle valve for controlling the engine, an accelerator pedal for controlling said throttle valve means adapted to provide a speed ratio change in said transmission, means including electro-magnetic and vacuum means for effecting operation of said change speed means to establish a speed ratio drive change, means responsive to a predetermined vehicle speed for conditioning said electro-magnetic means for effecting operation of said change speed means to establish a step-up in speed ratio drive in said transmission, means responsive to movement of the accelerator pedal to a predetermined position in throttle opening direction for conditioning said electro-magnetic means to effect a step-down in the speed ratio drive of the transmission thereby to obtain quick acceleration of the vehicle by said transmission, and means responsive to a predetermined higher vehicle speed when the vehicle is being driven in said stepped-up speed ratio drive for maintaining said electro-magnetic means in said stepped-up speed ratio establishing condition regardless of operation of the accelerator pedal as aforesaid.

45. A transmission comprising input and output shafts, an intermediate shaft, connections between the intermediate shaft and the other shafts, said connections including a pair of overrunning clutches, other connections between the intermediate shaft and the input and output shafts, one of said connections comprising a jaw clutch and another including a pawl and a slotted member engageable therewith, means for simultaneously conditioning the jaw clutch and pawl for operation, and means for delaying the operation of the jaw clutch to enable the operator selectively to control the establishing of said connections, said intermediate shaft being substantially disconnected at such time from the input and output shafts by reason of the overrunning clutches, thereby making possible the immediate operation of the pawl.

46. A transmission comprising input and output shafts, a plurality of gear trains connectible between the shafts to provide different speed ratios therebetween, positive means for establishing the gear trains, means for simultaneously conditioning at least two of said positive means for operation and means rendering one of said positive means slower in operation than the other, whereby to enable the operator selectively to control the establishing of the gear trains.

47. A variable speed transmission comprising in combination a countershaft type unit having low, second and direct drive ratios, and a planetary type unit having direct drive and overdrive ratios, automatically controlled means for effecting shifts between second and direct drive in the countershaft unit and between direct drive and overdrive in the planetary unit, said means being adapted to effect up shifts from second to direct to overdrive direct, and manually operated overcontrol means for effecting down-shifts from overdrive direct to overdrive second to second.

48. A variable speed transmission comprising in combination a countershaft type unit having low, second and direct drive ratios, and a planetary type unit having direct drive and overdrive ratios, automatically controlled means for effecting shifts between second and direct drive in the countershaft unit and between direct drive and overdrive in the planetary unit, said means being adapted to effect upshifts from second to direct to overdrive direct, manually operated overcontrol means for effecting down-shifts from overdrive direct to overdrive second to second, and means for limiting said down-shifts above a predetermined speed of operation of one of the units from overdrive direct to direct only.

49. A variable speed transmision comprising in combination input and output shafts, a countershaft type unit having second and direct drive ratios, a planetary type unit having direct drive and overdrive ratios, said units being connected in tandem between said shafts, governor means for controlling speed ratio changes in said units and automatically controlled means under control of said governor means for effecting shifts between second and direct drive in the countershaft unit, and between direct drive and overdrive in the planetary unit, said last means being adapted to effect shifts from second to direct to overdrive direct.

50. A variable speed transmission having first and second movable elements for effecting speed ratio changes through the transmission, electromagnetic means for controlling the elements, and means for controlling the electromagnetic means, said controlling means for the electromagnetic means including a manually controlled switch and a speed controlled switch having a plurality of sets of contacts, one set controlling the first element, the second controlling the second element, and the third set controlling the first element in conjunction with the manually controlled switch within a predetermined range of speeds to effect a downward change in speed, and above a predetermined speed to prevent a downward change in speed by the first element and to permit a downward change in speed by the second element.

51. A variable speed transmission comprising in combination input and output shafts, a countershaft type unit having second and direct drive ratios, a planetary type unit having direct drive and overdrive ratios, said units being connected in tandem between said shafts, speed responsive control means for controlling speed ratio changes in said units, and automatically operable means under control of at least part of said control means for effecting shift between second and direct drive in the countershaft unit, and under control of another part of said control means for effecting shift between direct drive and overdrive in the planetary unit, said automatically operable means being adapted to effect shifts from second to direct to overdrive direct.

52. A variable speed transmission comprising in combination input and output shafts, a countershaft type unit having second and direct drive ratios, the former comprising a speed reducing countershaft drive; a planetary type unit having direct drive and overdrive ratios; said units being connected in tandem between said shafts; and means comprising automatically controlled speed ratio changing means operable for effecting shifts between second and direct drive in the countershaft unit and between direct drive and overdrive in the planetary unit and so constructed and arranged as to be adapted to effect shifts from second to direct to overdrive direct according to predetermined vehicle speeds.

53. A variable speed transmission comprising in combination input and output shafts, a countershaft type unit having second and direct drive ratios, the former comprising a speed reducing countershaft drive; a planetary type unit having direct and overdrive ratios; said units being connected in tandem between said shafts; means including a vehicle speed responsive governor and electrical circuit means controlled thereby for controlling speed ratio changes in said units, and automatically controlled means under control of at least part of said ratio controlling means for effecting shift between second and direct drive in the countershaft unit and under control of another part of said control means for effecting shift between direct drive and overdrive in the planetary unit, said automatically controlled means being adapted to effect shifts from second to direct to overdrive direct.

References Cited in the file of this patent

UNITED STATES PATENTS

| | | |
|---|---|---|
| Re. 21,844 | Vetter | June 24, 1941 |
| 1,137,507 | McKeever | Apr. 27, 1915 |
| 1,754,868 | Wehling | Apr. 15, 1930 |
| 1,765,659 | Davis | June 24, 1930 |
| 1,791,502 | Hoy | Feb. 10, 1931 |
| 1,891,678 | Maybach | Dec. 20, 1932 |
| 1,911,599 | Bloxsom | May 30, 1933 |
| 1,990,690 | Hantschel et al | Feb. 12, 1935 |
| 1,993,544 | Fleischel | Mar. 5, 1935 |
| 2,051,553 | Fleischel | Aug. 18, 1936 |
| 2,106,607 | Kelley | Jan. 25, 1938 |
| 2,109,615 | Durham | Mar. 1, 1938 |
| 2,154,419 | Cotterman | Apr. 18, 1939 |
| 2,169,216 | Bloxsom | Aug. 15, 1939 |
| 2,225,493 | Barnes | Dec. 17, 1940 |
| 2,234,392 | Tibbetts | Mar. 11, 1941 |
| 2,239,182 | Werder | Apr. 22, 1941 |
| 2,253,711 | Kearns | Aug. 26, 1941 |
| 2,257,838 | Claytor | Oct. 7, 1941 |
| 2,267,603 | Claytor | Dec. 23, 1941 |
| 2,277,157 | Sneed | Mar. 24, 1942 |
| 2,282,053 | Hey | May 5, 1942 |
| 2,284,246 | Baade | May 26, 1942 |
| 2,322,479 | Schjolin | June 22, 1943 |

FOREIGN PATENTS

| | | |
|---|---|---|
| 696,226 | Germany | Sept. 14, 1940 |

UNITED STATES PATENT OFFICE
CERTIFICATE OF CORRECTION

Patent No. 2,916,935                                  December 15, 1959

Herbert F. Patterson et al.

It is hereby certified that error appears in the printed specification of the above numbered patent requiring correction and that the said Letters Patent should read as corrected below.

Column 2, line 12, for "in Fig. 7" read -- of Fig. 7 --; column 4, line 18, for "clutching 94," read -- clutch 94, --; column 6, line 30, for "extended" read -- extending --; column 27, line 37, for "enegageable" read -- engageable --; line 62, after "pedal" strike out the colon and insert instead a semi-colon; column 28, line 38, for "aid" read -- said --; column 30, line 37, for "estabilsh" read -- establish --; column 31, line 62, after "throttle" insert -- valve in throttle closing direction for --; line 68, after "valve" insert a comma; column 32, line 9, after "drive" insert a comma; line 26, for "overunning" read -- overrunning --.

Signed and sealed this 7th day of June 1960.

(SEAL)
Attest:

KARL H. AXLINE
Attesting Officer

ROBERT C. WATSON
Commissioner of Patents